US011333677B2

(12) United States Patent
Cook et al.

(10) Patent No.: US 11,333,677 B2
(45) Date of Patent: May 17, 2022

(54) METHODS AND APPARATUSES FOR DETECTING TAMPER USING HEURISTIC MODELS

(71) Applicant: CACI, Inc.—Federal, Arlington, VA (US)

(72) Inventors: James Andrew Cook, Lompoc, CA (US); Eric David Nystrom, Carpinteria, CA (US); Renato M. Camarda, Fanwood, NJ (US)

(73) Assignee: CACI, INC.—FEDERAL, Reston, VA (US)

( * ) Notice: Subject to any disclaimer, the term of this patent is extended or adjusted under 35 U.S.C. 154(b) by 401 days.

(21) Appl. No.: 16/512,713

(22) Filed: Jul. 16, 2019

(65) Prior Publication Data
US 2020/0025789 A1   Jan. 23, 2020

Related U.S. Application Data

(60) Provisional application No. 62/702,054, filed on Jul. 23, 2018.

(51) Int. Cl.
| | |
|---|---|
| *G01P 13/00* | (2006.01) |
| *G01C 21/16* | (2006.01) |
| *G05B 19/042* | (2006.01) |
| *G01P 15/18* | (2013.01) |
| *G06N 20/10* | (2019.01) |

(Continued)

(52) U.S. Cl.
CPC ............ *G01P 13/00* (2013.01); *G01C 21/165* (2013.01); *G01P 15/18* (2013.01); *G05B 19/0428* (2013.01); *G06K 9/6267* (2013.01); *G06N 3/04* (2013.01); *G06N 20/10* (2019.01);
(Continued)

(58) Field of Classification Search
CPC ... G01P 13/00; G01C 21/165; G05B 19/0428; G05B 2219/25257; G06N 20/10
See application file for complete search history.

(56) References Cited

U.S. PATENT DOCUMENTS

| | | |
|---|---|---|
| D292,698 S | 11/1987 | DeVita et al. |
| 5,326,284 A | 7/1994 | Bohbot et al. |

(Continued)

*Primary Examiner* — Manuel A Rivera Vargas
(74) *Attorney, Agent, or Firm* — BakerHostetler; Tayan B. Patel

(57) ABSTRACT

The present application includes a computer-implemented method for detecting a tamper event. The method includes a step of receiving, from one or more sensors on an integrated module, data indicating one or more of light, acceleration, magnetic field, rotation, temperature, pressure, humidity, and audio. The method also includes a step of transmitting, to a microcontroller/evaluation engine coupled to the integrated module, the received data from the one or more sensors. The method further includes a step of determining, via the microcontroller, the received data exceeding one or more configurable thresholds of the tamper event. The method even further includes a step of assigning, via the microcontroller, a score associated with each of the one or more configurable thresholds being exceeded by the received data. The method yet even further includes a step of collecting, via the microcontroller, an aggregate total based on the assigning step. The method still further includes a step of evaluating, via the controller, the aggregate total in view of a predetermined alarm threshold of the tamper event.

20 Claims, 28 Drawing Sheets

(51) Int. Cl.
*G06K 9/62* (2022.01)
*G06N 3/04* (2006.01)
*H04W 4/38* (2018.01)
*H04W 4/70* (2018.01)

(52) U.S. Cl.
CPC ..... *G05B 2219/25257* (2013.01); *H04W 4/38* (2018.02); *H04W 4/70* (2018.02)

(56) References Cited

U.S. PATENT DOCUMENTS

| | | |
|---|---|---|
| D430,856 S | 9/2000 | Wilkerson |
| D466,093 S | 11/2002 | Ebihara et al. |
| D508,681 S | 8/2005 | Enderlein et al. |
| D525,213 S | 7/2006 | Enderlein et al. |
| D540,272 S | 4/2007 | Higashibata |
| D603,812 S | 11/2009 | Johnson et al. |
| D639,756 S | 6/2011 | Greene, Jr. |
| D642,546 S | 8/2011 | Greene, Jr. |
| D647,072 S | 10/2011 | Bentley |
| D655,256 S | 3/2012 | Nishiguchi et al. |
| D673,921 S | 1/2013 | Ozawa |
| D678,227 S | 3/2013 | Takahashi et al. |
| D690,672 S | 10/2013 | Yoshida et al. |
| D699,201 S | 2/2014 | Petsch |
| D768,115 S | 10/2016 | Kazanchian |
| D799,438 S | 10/2017 | Takahashi et al. |
| 10,062,249 B1 | 8/2018 | Modi et al. |
| D831,009 S | 10/2018 | Horn |
| 10,127,409 B1 * | 11/2018 | Wade ............... G06Q 20/30 |
| D837,171 S | 1/2019 | Vasoya et al. |
| D856,948 S | 8/2019 | Vasoya et al. |
| D864,968 S | 10/2019 | Beals |
| 10,461,428 B2 | 10/2019 | Jeong et al. |
| 10,510,626 B2 | 12/2019 | Braun et al. |
| D872,032 S | 1/2020 | Morelli et al. |
| D872,033 S | 1/2020 | Morelli et al. |
| D883,240 S | 5/2020 | Fathauer |
| D887,998 S | 6/2020 | Krasnopolski et al. |
| D893,439 S | 8/2020 | Vasoya et al. |
| D902,164 S | 11/2020 | Kondo et al. |
| D904,325 S | 12/2020 | Omichi |
| D904,355 S | 12/2020 | Horn |
| 10,856,744 B2 | 12/2020 | Yuen et al. |
| D909,319 S | 2/2021 | Nordeen |
| D911,298 S | 2/2021 | Krasnopolski et al. |
| D930,000 S | 9/2021 | Yang |
| D930,001 S | 9/2021 | Yang |
| D930,601 S | 9/2021 | McBride et al. |
| 2006/0043544 A1 | 3/2006 | Tsukamoto et al. |
| 2006/0097374 A1 | 5/2006 | Egawa |
| 2006/0186520 A1 | 8/2006 | Toba et al. |
| 2008/0089020 A1 | 4/2008 | Hiew et al. |
| 2008/0123318 A1 | 5/2008 | Lam |
| 2008/0137278 A1 | 6/2008 | Chih |
| 2008/0144290 A1 | 6/2008 | Brandt et al. |
| 2008/0200041 A1 | 8/2008 | Lin et al. |
| 2009/0268390 A1 | 10/2009 | King et al. |
| 2017/0034941 A1 | 2/2017 | McCurley et al. |
| 2017/0045187 A1 | 2/2017 | Li et al. |
| 2017/0058565 A1 | 3/2017 | Sanchez et al. |
| 2017/0227566 A1 | 8/2017 | Gregory |
| 2018/0293860 A1 | 10/2018 | Britton et al. |
| 2019/0331828 A1 | 10/2019 | Mutlu et al. |
| 2020/0128358 A1 | 4/2020 | Komoni et al. |

* cited by examiner

METHODS AND APPARATUSES FOR DETECTING TAMPER USING HEURISTIC MODELS

CROSS-REFERENCE TO RELATED APPLICATIONS

This application claims the benefit of priority of U.S. Provisional application No. 62/702,054 filed Jul. 23, 2018, entitled "Integrated Tamper Detection Systems and Methods," the contents of which is incorporated by reference in its entirety. The instant application is related to a U.S. Non-Provisional application entitled, "Integrated Tamper Detection Systems and Methods" and a U.S. Non-Provisional application entitled, "Methods and Apparatuses for Detecting Tamper Using Machine Learning Models" both concurrently filed herewith.

FIELD

This application is generally related to apparatuses and methods for detecting tamper using machine learning models.

BACKGROUND

Detection of tamper events is typically performed by monitoring conditions using a sensor, and depending on the type of sensor employed, a unique identifier may be returned to indicate that a change in condition has occurred. In the related art, one technique employs an accelerometer to constantly monitor changes based on some external force. Alternatively, for optical detection, an image sensor may be employed to detect changes to a known pixel state from an external source.

Each of these techniques has its advantages and drawbacks. For example, accelerometers work well when the item of interest is kept in a stationary setting. However, monitoring becomes more complicated if the object is in a setting where there is constant motion, such as when the object is being transported on a moving vehicle. Optical detection may recognize the item of interest remaining generally in the same physical location despite minor motion. However it may be ineffective in low-light or no-light environments. Additionally, sensors and implementations in the related art typically require advanced software algorithms to help analyze and compute when the raw data from a single sensor should be interpreted as a positive tamper event or whether there are other external environmental factors present that may cause a false positive.

Deep learning has been widely applied to image understanding, speech recognition, natural language translation, games, and many other prediction and classification problems. However, machine learning remains a hard problem when implementing existing algorithms and models to fit into a given application.

What is needed in the art is a method and system to better filter out false positives, to better identify tamper events, and to avoid complicated and costly integration efforts associated with pairing existing devices from various market sectors.

SUMMARY

The foregoing needs are met, to a great extent, with a method and system comprising an integrated circuit (IC) or integrated module operable to provide detection from multiple sensor physics as disclosed in the present application. The IC or integrated module may monitor and log/record all events as they occur. An interface may be provided to relay the logged events for further processing through data analytics.

One aspect of the present application includes a computer-implemented method for detecting a tamper event. The method includes a step of receiving, from one or more sensors on an integrated module, data indicating one or more of light, acceleration, magnetic field, rotation, temperature, pressure, humidity, and audio. The method also includes a step of transmitting, to a microcontroller/evaluation engine coupled to the integrated module, the received data from the one or more sensors. The method further includes a step of determining, via the microcontroller, the received data exceeding one or more configurable thresholds of the tamper event. The method even further includes a step of assigning, via the microcontroller, a score associated with each of the one or more configurable thresholds being exceeded by the received data. The method yet even further includes a step of collecting, via the microcontroller, an aggregate total based on the assigning step. The method still further includes a step of evaluating, via the controller, the aggregate total in view of a predetermined alarm threshold of the tamper event.

Another aspect of the application includes a system for detecting tamper. The system includes a non-transitory memory and a processor coupled to the memory and configured to execute instructions. The instructions include receiving, from one or more sensors on an integrated module, data indicating one or more of light, acceleration, magnetic field, rotation, temperature, pressure, humidity, and audio. The instructions also include transmitting, to a microcontroller/evaluation engine coupled to the integrated module, the received data from the one or more sensors. The instructions further include determining, via the microcontroller, the received data exceeding one or more configurable thresholds of the tamper event. The instructions even further include assigning, via the microcontroller, a score associated with each of the one or more configurable thresholds exceeded by the received data. The instructions yet even further include collecting, via the microcontroller, an aggregate total based on the assigning step.

There has thus been outlined, rather broadly, certain inventive embodiments of the present application in order that the detailed description thereof herein may be better understood, and in order that the present contribution to the art may be better appreciated. There are, of course, additional embodiments that will be described below and which will form the subject matter of the claims appended hereto.

BRIEF DESCRIPTION OF THE DRAWINGS

In order to facilitate a fuller understanding of the inventive aspects in the present application, reference is now made to the accompanying drawings, in which like elements are referenced with like numerals. These drawings should not be construed as limiting the invention and intended only to be illustrative.

DETAILED DESCRIPTION

Figure 1A:
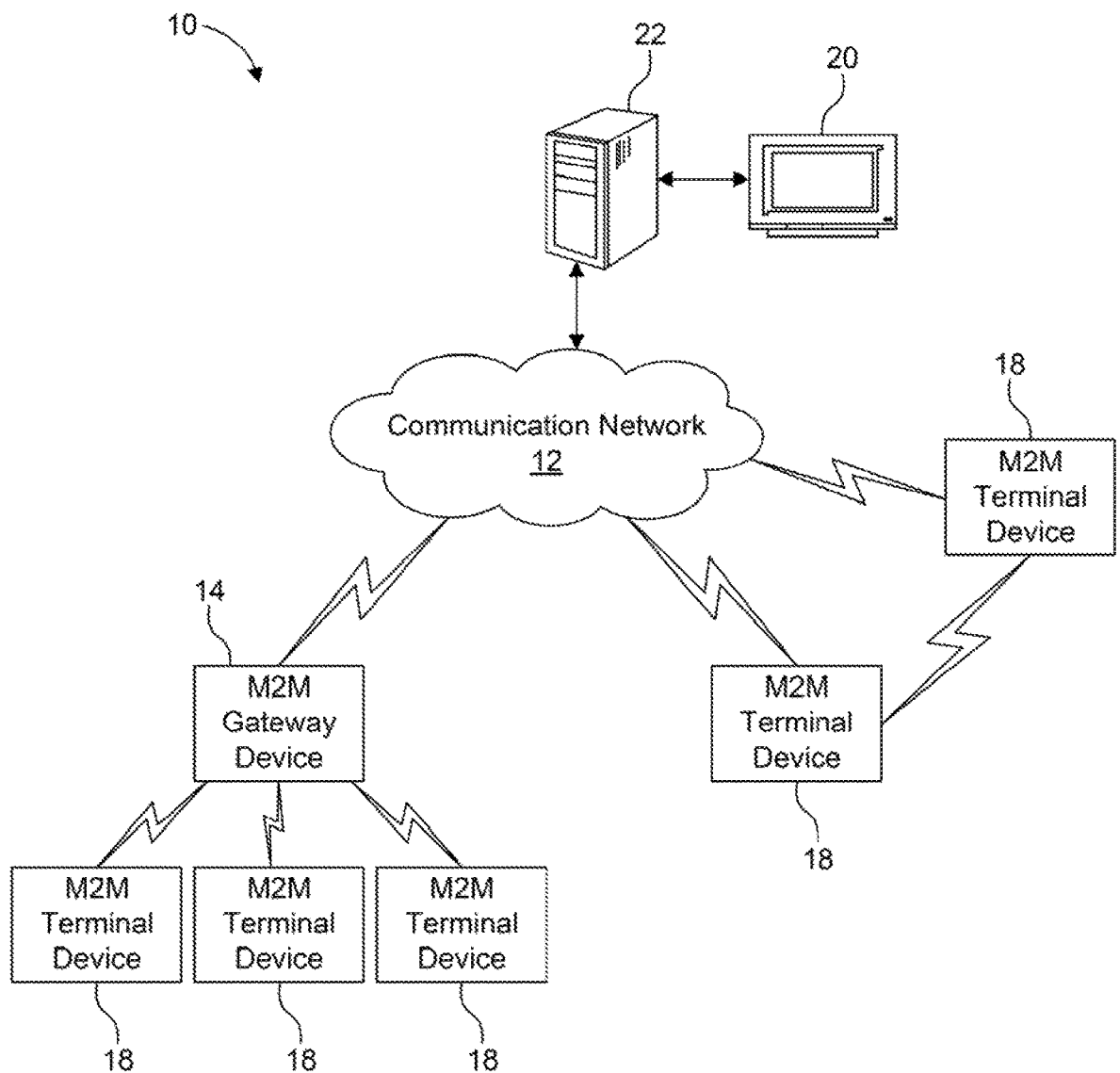
FIG. 1A illustrates a system diagram of an exemplary communication system in which one or more disclosed aspects may be implemented.

In this respect, before explaining at least one embodiment of the present application in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

Reference in this application to "one embodiment," "an embodiment," "one or more embodiments," or the like means that a particular feature, structure, or characteristic described in connection with the embodiment is included in at least one embodiment of the disclosure. The appearances of, for example, the phrases "an embodiment" in various places in the specification are not necessarily all referring to the same embodiment, nor are separate or alternative embodiments mutually exclusive of other embodiments. Moreover, various features are described which may be exhibited by some embodiments and not by the other. Similarly, various requirements are described which may be requirements for some embodiments but not by other embodiments.

It has been determined by the inventors and described herein that the inventive method and system provides an integrated solution that will automatically monitor and identify tamper events, provide time and date information of the actual tamper event, and relay the information back to host devices system for further action. The present method and system may be applied to any device, object, or item that would benefit from tamper detection, providing the system and/or relevant users with an update that the item has been tampered with, moved, or that some environmental change has occurred. Items that could benefit from tamper detection may comprise personal electronics (including, but not limited to, cellphones, laptops, and tablets), industrial equipment (including, but not limited to, sensitive instrumentation and expensive cargo), government equipment (including, but not limited to, weapons, tools, and vehicles), and Internet of Things (IoT) devices (including, but not limited to, sensors, controls, actuators, and appliances). Other items that may benefit from tamper detection may include backpack, purses, and other valuable items.

In a first aspect of the application, an integrated module is provided for detecting tamper events. The integrated module includes a microcontroller, an inertial measurement unit (IMU) including one or more of an accelerometer, gyroscope and magnetometer, a low-power accelerometer, and an environmental sensor including one or more of a temperature, pressure and humidity sensor.

In a second aspect of the application a method of making an integrated module is described.

In a third aspect of the application, a tamper detection system is described. The tamper detection system includes a consumer article and an integrated module.

In a further aspect of the application, a method of detecting tamper events is described. In one aspect, the method employs a heuristic algorithm. In another aspect, the method employs a machine learning algorithm.

General Architecture

FIG. 1A is a diagram of an example machine to machine (M2M), Internet of Things (IoT), or web of things (WoT) communication system 10 (i.e., labeled as reference indicator 10 in FIG. 1A with a similar format used throughout for other elements in the figures of this application) in which one or more disclosed embodiments may be implemented.

As shown in FIG. 1A, the M2M, IoT, or WoT communication system 10 includes a communication network 12. The communication network 12 may be a fixed network (e.g., Ethernet, Fiber, Integrated Services Digital Network (ISDN), Power Line Communication (PLC), or the like), a wireless network (e.g., Wireless Local Area Network (WLAN), cellular, or the like), or a network of heterogeneous networks. For example, the communication network 12 may be comprised of multiple access networks that provide content such as voice, data, video, messaging, broadcast, or the like to multiple users. The communication network 12 may comprise other networks, such as a core network, the Internet, a sensor network, an industrial control network, a personal area network, a fused personal network, a satellite network, a home network, or an enterprise network.

As shown in FIG. 1A, the M2M, IoT, or WoT communication system 10 may include M2M gateway devices 14 and M2M terminal devices 18. It will be appreciated that any number of M2M Gateway Devices 14 and M2M terminal devices 18 may be included in the M2M, IoT, WoT communication system 10 as desired. Each of the M2M gateway devices 14 and M2M Terminal devices 18 are configured to transmit and receive signals, such as via communications circuitry, the communication network 12, or direct radio link. For example, the M2M terminal devices 18 may collect data and send the data, via the communication network 12 or direct radio link, to an M2M application 20 or other M2M terminal device 18. The M2M terminal devices may include consumer electronic devices. The M2M terminal devices 18 may also receive data from the M2M application 20 or another M2M terminal device 18. In a further embodiment, data and signals may be sent to and received from the M2M application 20 via an M2M Service Layer 22, as described below. Exemplary M2M terminal devices 18 that could be impacted by the presence of a tamper event include, but art not limited to, tablets, smart phones, medical devices, temperature and weather monitors, heavy machinery, consumer electronics, crypto, security devices, recreational equipment, and the like.

Figure 1B:
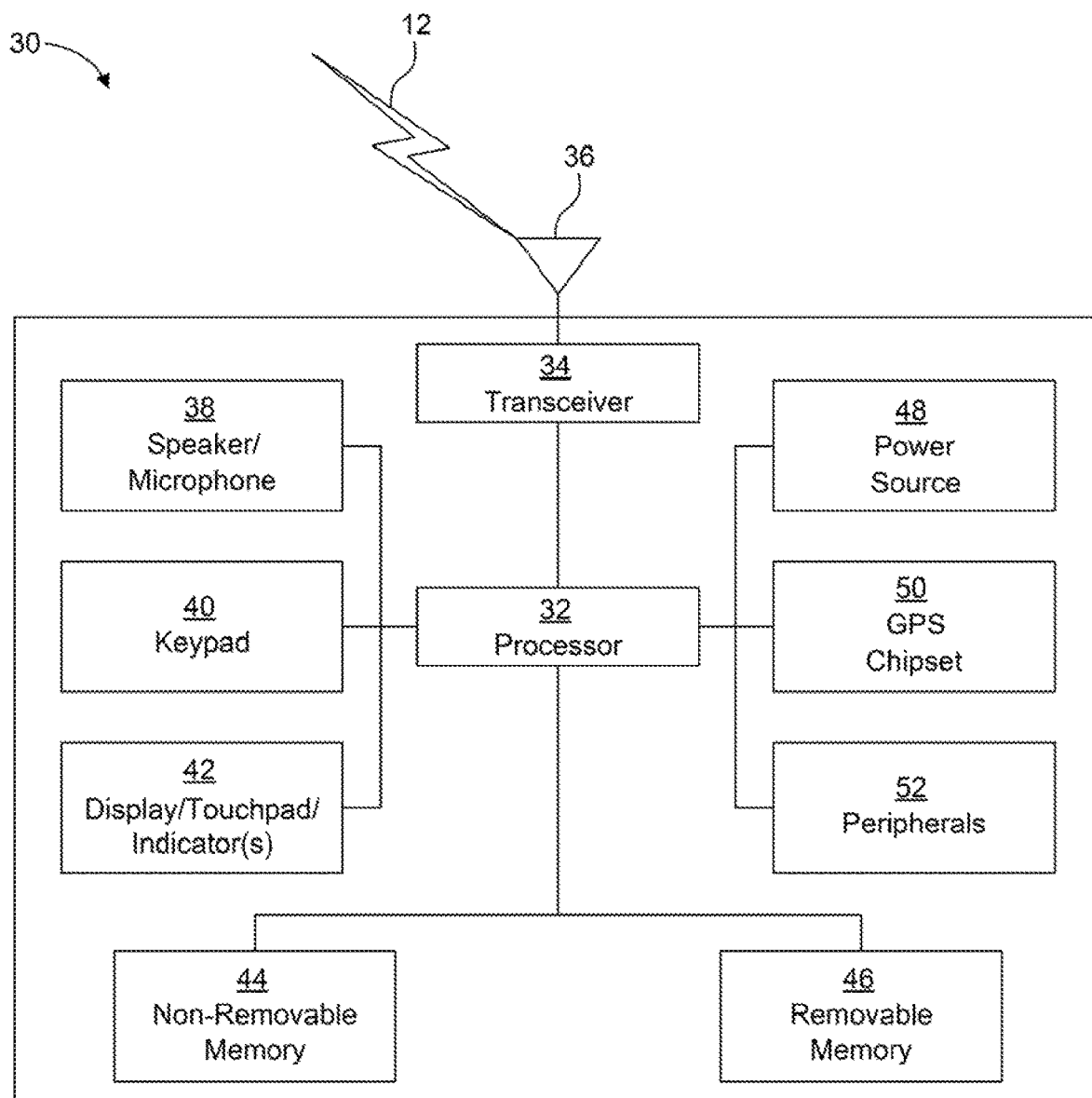
FIG. 1B illustrates a system diagram of an exemplary communication network node.

FIG. 1B is a block diagram of an exemplary hardware/software architecture of a node 30 of a network. The node 30 may include a processor 32, non-removable memory 44, removable memory 46, a speaker/microphone 38, a keypad 40, a display, touchpad, and/or indicators 42, a power source 48, a global positioning system (GPS) chipset 50, and other peripherals 52. The node 30 may also include communication circuitry, such as a transceiver 34 and a transmit/receive element 36. The node 30 may include any sub-combination of the foregoing elements while remaining consistent with an embodiment.

The processor 32 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. In general, the processor 32 may execute computer-executable instructions stored in the memory (e.g., memory 44 and/or memory 46) of the node 30 in order to perform the various required functions of the node 30. For example, the processor 32 may perform signal coding, data processing, power control, input/output processing, and/or any other functionality that enables the node 30 to operate in a wireless or wired environment. The processor 32 may run application-layer programs (e.g., browsers) and/or radio-access-layer (RAN) programs and/or other communications programs. The processor 32 may also perform security operations, such as authentication, security key agreement, and/or cryptographic operations. The security operations may be performed, for example, at the access layer and/or application layer.

As shown in FIG. 1B, the processor 32 is coupled to its communication circuitry (e.g., transceiver 34 and transmit/receive element 36). The processor 32, through the execution of computer-executable instructions, may control the communication circuitry to cause the node 30 to communicate with other nodes via the network to which it is connected. While FIG. 1B depicts the processor 32 and the transceiver 34 as separate components, the processor 32 and the transceiver 34 may be integrated together in an electronic package or chip.

The transmit/receive element 36 may be configured to transmit signals to, or receive signals from, other nodes, including M2M servers, gateways, wireless devices, and the like. For example, in an embodiment, the transmit/receive element 36 may be an antenna configured to transmit and/or receive RF signals. The transmit/receive element 36 may support various networks and air interfaces, such as WLAN, WPAN, cellular, and the like. In an embodiment, the transmit/receive element 36 may be an emitter/detector configured to transmit and/or receive IR, UV, or visible light signals, for example. In yet another embodiment, the transmit/receive element 36 may be configured to transmit and receive both RF and light signals. The transmit/receive element 36 may be configured to transmit and/or receive any combination of wireless or wired signals.

In addition, although the transmit/receive element 36 is depicted in FIG. 1B as a single element, the node 30 may include any number of transmit/receive elements 36. More specifically, the node 30 may employ multiple-input and multiple-output (MIMO) technology. Thus, in an embodiment, the node 30 may include two or more transmit/receive elements 36 (e.g., multiple antennas) for transmitting and receiving wireless signals.

The transceiver 34 may be configured to modulate the signals that are to be transmitted by the transmit/receive element 36 and to demodulate the signals that are received by the transmit/receive element 36. As noted above, the node 30 may have multi-mode capabilities. Thus, the transceiver 34 may include multiple transceivers for enabling the node 30 to communicate via multiple RATs, such as Universal Terrestrial Radio Access (UTRA) and IEEE 802.11, for example.

The processor 32 may access information from, and store data in, any type of suitable memory, such as the non-removable memory 44 and/or the removable memory 46. For example, the processor 32 may store session context in its memory, as described above. The non-removable memory 44 may include random-access memory (RAM), read-only memory (ROM), a hard disk, or any other type of memory storage device. The removable memory 46 may include a subscriber identity module (SIM) card, a memory stick, a secure digital (SD) memory card, and the like. In other embodiments, the processor 32 may access information from, and store data in, memory that is not physically located on the node 30, such as on a server or a home computer.

The processor 32 may receive power from the power source 48, and may be configured to distribute and/or control the power to the other components in the node 30. The power source 48 may be any suitable device for powering the node 30. For example, the power source 48 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 32 may also be coupled to the GPS chipset 50, which is configured to provide location information (e.g., longitude and latitude) regarding the current location of the node 30. The node 30 may acquire location information by way of any suitable location-determination method while remaining consistent with an embodiment.

The processor 32 may further be coupled to other peripherals 52, which may include one or more software and/or hardware modules that provide additional features, functionality, and/or wired or wireless connectivity. For example, the peripherals 52 may include various component, such as for example, an IMU including one or more of an accelerometer, gyroscope, or magnetometer; light sensor; additional microphone(s); environmental sensors including one or more of a temperature, pressure, humidity sensor; proximity sensor; light sensor; satellite transceiver, digital camera (for photographs or video), universal serial bus (USB) port or other interconnect interfaces, vibration device, television transceiver, hands free headset, Bluetooth® module, frequency modulated (FM) radio unit, digital music player, media player, video game player module, Internet browser, and the like.

The node 30 may be embodied in other apparatuses or devices, such as a sensor, consumer electronics, a wearable device such as a smart watch or smart clothing, a medical or eHealth device, a robot, industrial equipment, a drone, vehicles such as cars, trucks, trains, boats, aircraft and the like. The node 30 may connect to other components, modules, or systems of such apparatuses or devices via one or more interconnect interfaces, such as an interconnect interface that may comprise one of the peripherals 52.

Figure 1C:
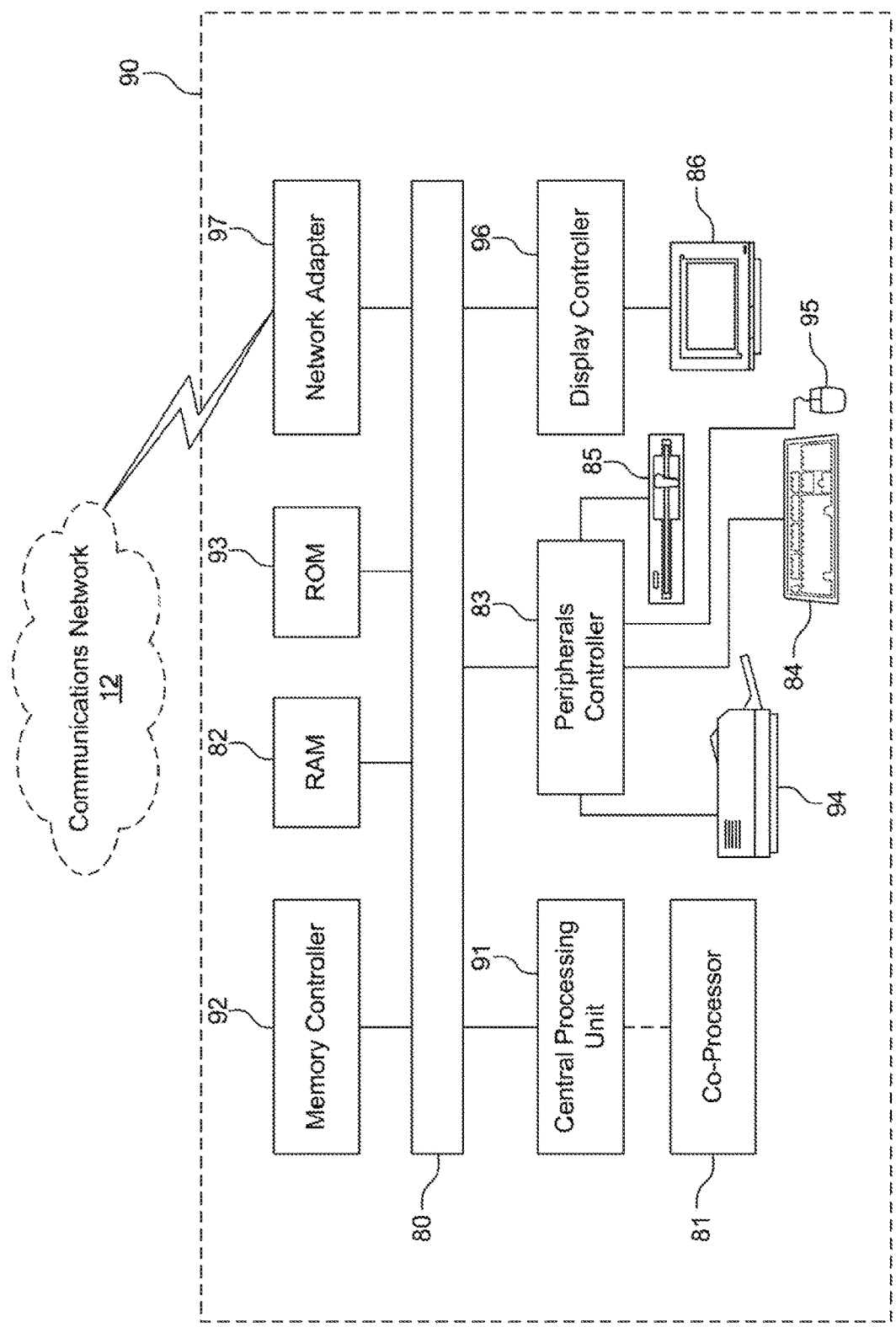
FIG. 1C illustrates a block diagram of an exemplary computing system.

FIG. 1C is a block diagram of an exemplary computing system 90 that may also be used to implement one or more nodes (e.g., clients, servers, or proxies) of a network, which may operate as an M2M server, gateway, device, or other node in an M2M network.

The computing system 90 may comprise a computer or server and may be controlled primarily by computer-readable instructions, which may be in the form of software, by whatever means such software is stored or accessed. Such computer-readable instructions may be executed within a processor, such as a central processing unit (CPU) 91, to cause the computing system 90 to effectuate various operations. In many known workstations, servers, and personal computers, the CPU 91 is implemented by a single-chip CPU called a microprocessor. In other machines, the CPU 91 may comprise multiple processors. A co-processor 81 is an optional processor, distinct from the CPU 91 that performs additional functions or assists the CPU 91.

In operation, the CPU 91 fetches, decodes, executes instructions, and transfers information to and from other resources via the computer's main data-transfer path, a system bus 80. Such a system bus 80 connects the components in the computing system 90 and defines the medium for data exchange. The system bus 80 typically includes data lines for sending data, address lines for sending addresses, and control lines for sending interrupts and for operating the system bus 80. An example of such a system bus 80 is the PCI (Peripheral Component Interconnect) bus.

Memories coupled to the system bus 80 include RAM 82 and ROM 93. Such memories include circuitry that allows information to be stored and retrieved. The ROM 93 generally contains stored data that cannot easily be modified. Data stored in the RAM 82 may be read or changed by the CPU 91 or other hardware devices. Access to the RAM 82 and/or the ROM 93 may be controlled by a memory controller 92. The memory controller 92 may provide an address translation function that translates virtual addresses into physical addresses as instructions are executed. The memory controller 92 may also provide a memory protection function that isolates processes within the system and isolates system processes from user processes. Thus, a program running in a first mode may access only memory mapped by its own process virtual address space. It cannot access memory within another process's virtual address space unless memory sharing between the processes has been set up.

In addition, the computing system 90 may contain a peripherals controller 83 responsible for communicating instructions from the CPU 91 to peripherals, such as a printer 94, a keyboard 84, a mouse 95, and a disk drive 85.

A display 86, which is controlled by a display controller 96, is used to display visual output generated by the computing system 90. Such visual output may include text, graphics, animated graphics, and video. The display 86 may be implemented with a CRT-based video display, an LCD-based flat-panel display, gas plasma-based flat-panel display, or a touch-panel. The display controller 96 includes electronic components required to generate a video signal that is sent to the display 86.

Further, the computing system 90 may contain communication circuitry, such as a network adaptor 97, that may be used to connect the computing system 90 to an external communications network, such as the communication network 12 of FIG. 1A, to enable the computing system 90 to communicate with other nodes of the network.

Firmware

Figure 1D:
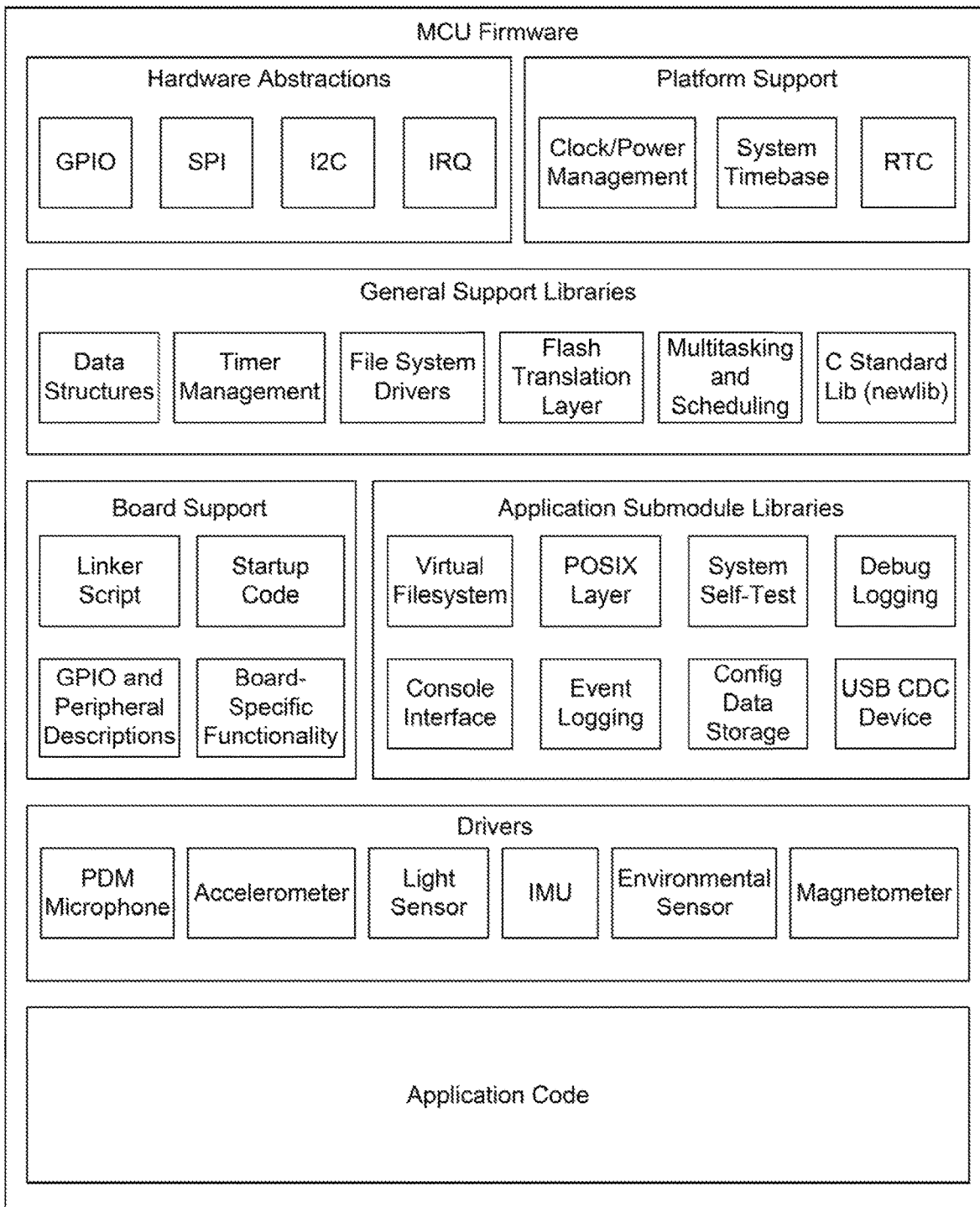
FIG. 1D illustrates exemplary firmware implemented in one or more aspect of the present application.

FIG. 1D illustrates an exemplary embodiment of the employed firmware architecture. As depicted, the hardware abstractions include a GPIO, SPI, I2C and IRQ. The Platform support includes clock/power management, a system time base and RTC. Below the hardware abstractions and platform support is General Support Libraries. General Support Libraries includes data structure, timer management, file system drivers, flash translation layer, multitasking and scheduling and C standard lib (newlib).

Under General Support Libraries are Board Support and Application Submodule Libraries. Board Support includes linker script, startup code, GPIO and peripheral descriptions, and board-specific functionality. Application Submodule Libraries include virtual file system, POSIX layer, system self-test, debug logging, console interface, event logging, config data storage, and USB CDC Device.

Below Board Support and Application Submodule Libraries are the Drivers. The Drivers include PDM microphone, MC3672 Accelerometer, MAX44009 Light Sensor, BMX160 IMU, BME280 Environmental Sensor and LIS3MDL Magnetometer.

Below the Drivers is Application Code. It is envisaged the Firmware of FIG. 1D can be employed by the processor as described in FIGS. 1B and 1C above.

Integrated Circuit

Figure 1E:
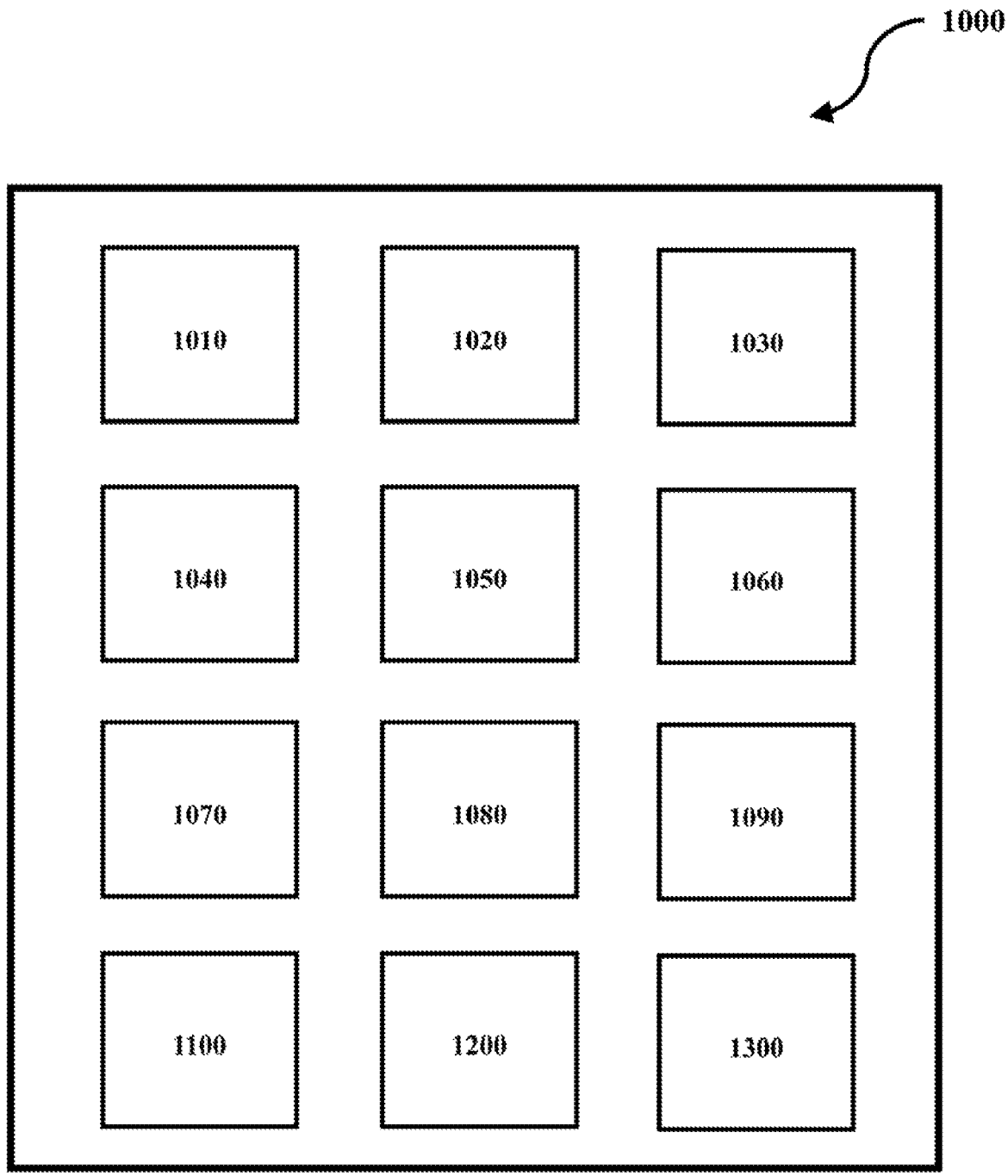
FIG. 1E illustrates a block diagram of an exemplary integrated circuit (IC) or integrated module in accordance with aspects of the present application.

According to another embodiment, FIG. 1E illustrates an exemplary integrated circuit (IC) or integrated module 1000 for performing tamper detection. In accordance with one aspect, the integrated module 1000 may include a plurality of sensor types. The sensor types for the integrated module 1000 may include one or more of a 3-axis gyroscope 1010, a microphone 1020, a pressure sensor 1030, a 3-axis accelerometer 1040, a humidity sensor 1050, a temperature sensor 1060, a light sensor 1070, a 3-axis magnetometer 1080, and a proximity sensor 1090. By obtaining data from multiple sensor types, such as the sensors listed above, the integrated module 1000 is capable of filtering out more false alarms and be more capable of identifying positive tamper event.

The integrated module 1000 may further comprise an input/output interface 1100, a processor 1200, and a memory 1300. The processor 1200 is operable to read data from the plurality of sensor types, and the data may be obtained via the input/output interface 1100. The processor 1200 may execute algorithms to characterize the data from the plurality of sensor types and determine if a tamper event is occurring or has occurred. The algorithm may be stored and read from the memory 1300, or any other non-transitory memory accessible by the processor 1200. In the event the processor 1200 has determined that a tamper event is occurring or has occurred, the processor 1200 may execute a command to store or log the tamper detection event to the memory 1300. The tamper detection event may be stored or logged with time and date information in the memory 1300. The integrated module 1000 may be formed as a single integrated circuit with the plurality of sensor types, the input/output interface 1100, the processor 1200, and the memory 1300 all embedded together onto the single integrated circuit.

In addition to the memory 1300, a secondary memory (not shown) may also be provided on board with the integrated module 1000. It may also be provided at a second location in order to provide redundancy and enable retrieval of data remote from the integrated module 1000 if the secondary memory is configured separately from the integrated module

1000. The input/output interface 1100 may comprise a USB interface, a Bluetooth® module, SPI, I2C, QSPI, UART and/or an output feedback module.

In accordance with an aspect of the present application, the processor 1200 may receive data from one or more of the 3-axis gyroscope 1010, the microphone 1020, the pressure sensor 1030, the 3-axis accelerometer 1040, the humidity sensor 1050, the temperature sensor 1060, the light sensor 1070, the 3-axis magnetometer 1080, and the proximity sensor 1090. The received data may be applied to or taken into consideration by the algorithm executed by the processor 1200 in making a determination of whether a tamper event is present. For example, data received from the 3-axis accelerometer 1040 may signify a change in acceleration, which may be indicative that the item of interest may be moving or has been moved. Data received from the 3-axis magnetometer 1080 may also signify a change in orientation, or a change in the magnetic field around the module, further indicating that the item of interest may be moving or has been moved from its previous position and location. The combination of data obtained from the plurality of sensor types therefore provides improved means for filtering false positives and assists in more accurately determining an actual tamper event.

In one exemplary embodiment, the integrated module 1000 may comprise the microphone 1020, the 3-axis accelerometer 1040, the light sensor 1070, the input/output interface 1100, the processor 1200, and the memory 1300. Each of these elements may be embedded together onto a single integrated circuit or module. The integrated module 1000 may be connected to a time/date engine and a power conditioning module (not shown). The power conditioning module may be used to regulate and/or to supply power to the integrated module 1000 and/or to the greater host devices system.

The processor 1200 may receive data from one or more of the microphone 1020, the 3-axis accelerometer 1040, and the light sensor 1070. The received data may be applied to or taken into consideration by the algorithm executed by the processor 1200 in making a determination of whether a tamper event is present. For example, data received from the 3-axis accelerometer 1040 may signify a change in acceleration, which may be indicative that the item of interest may be moving or has been moved. Changes in lighting condition detected by the light sensor 200 may further signify that the item of interest may be moving or has moved to a different environment, further indicating that the item of interest may be moving or has been moved from its previous position and location. The combination of data obtained from the plurality of sensor types therefor provides improved means for filtering false positives and assist in more accurately determining an actual tamper event.

The processor 1100 is operable to read data, via the input/output interface 1100, from one or more of the microphone 1020, the 3-axis accelerometer 1040, and the light sensor 1070. The processor is further operable to execute algorithms to characterize the retrieved data from the plurality of sensor types, and determine if a tamper event has occurred or is occurring. In the event the processor 1200 has determined that a tamper event has occurred or is occurring, the processor 1200 may execute a command to store or log the tamper detection event to the memory 1300 and the secondary memory. The tamper detection event may be stored or logged with time and date information into the memory 1300 and the secondary memory, and the time and date information may be retrieved from the time/date engine.

The processor 1200 may execute an interrupt sequence when the tamper detection event is present. The processor 1200 may send a command or request to the host devices system via one or more of the USB interface, the Bluetooth® module, and the output feedback module. The command or request may include an alert to a relevant user of the item of interest, initiate a pre-specified procedure to disable the item of interest, wipe information that may be stored on the item of interest, or provide live tracking of the item of interest. In accordance with another aspect, the Bluetooth® module may be configured as a Bluetooth® Low Energy (BLE) device.

Figure 2A:
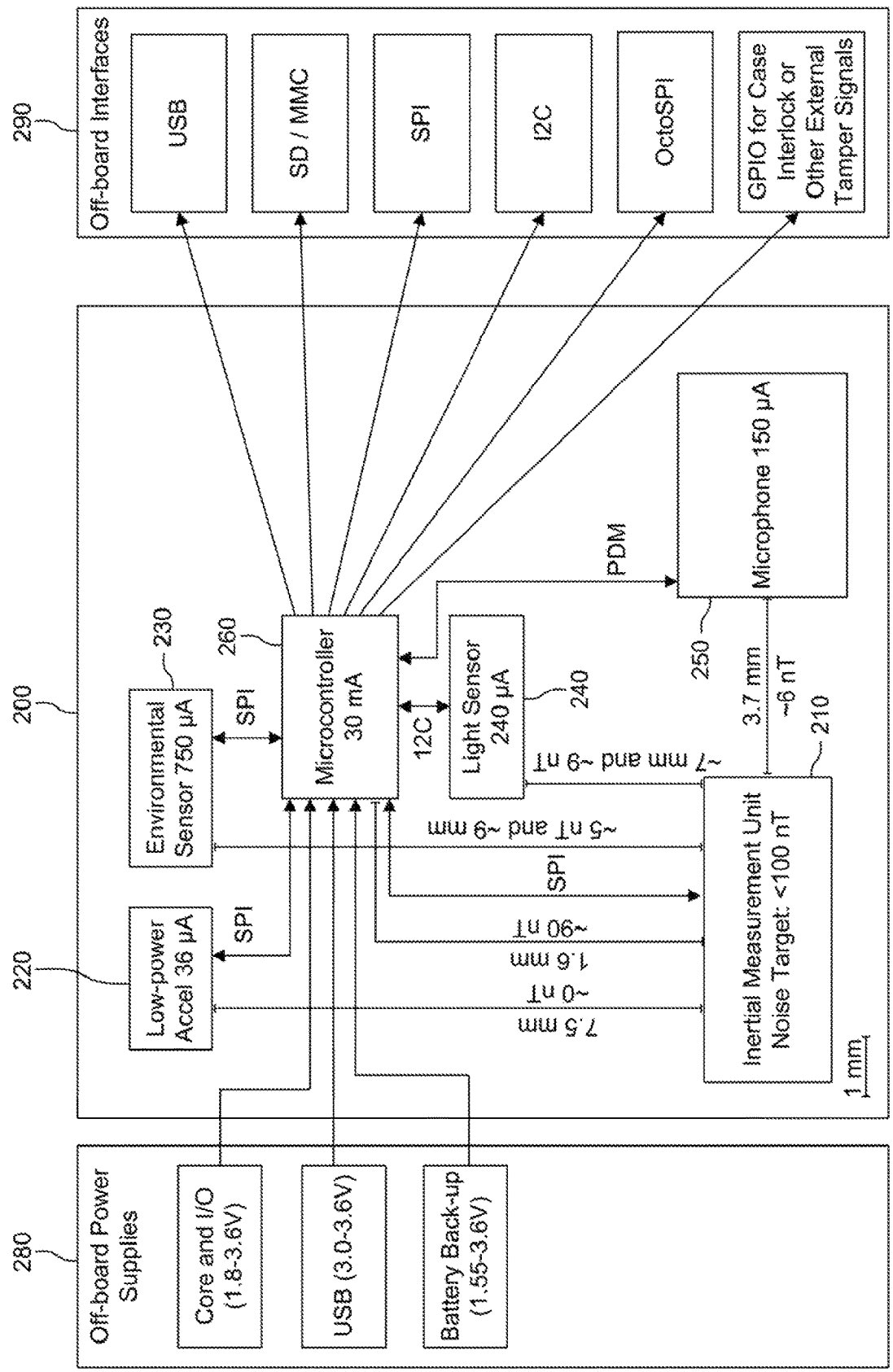
FIG. 2A illustrates an architecture of the tamper device according to an aspect of the application.

In another embodiment as shown in FIG. 2A, the IC 200 may include plural sensors on the board. Namely, these sensors may include an IMU 210, low-power accelerometer 220, Environment sensor 230, light sensor 240 and microphone 250. The IC may also include a microcontroller 260. Each of the low-power accelerometer 220, environmental sensor 230, light sensor 240, microphone 250 and microcontroller 260 operates at about 36 µA, 750 µA, 240 µA, 150 µA and 30 mA, respectively. It is envisaged these values have a degree of error of about ±10%.

In further reference to FIG. 2A, an exemplary distance and noise target between the IMU 210 and each of the other components is shown. The IMU 210 receives a noise target less than 100 nT. For example, the distance between the IMU 210 and low power accelerometer 220 is about 7.5 mm, at which distance the 36 micro-Amperes of current expected to flow in low power accelerometer 220 is expected to induce a negligible change in the magnetic field strength at the location of IMU 210 (i.e., 0 nT after rounding). The distance and noise target between the IMU 210 and the environmental sensor 230 are about 9 mm and about 5 nT. The distance and noise target between the IMU 210 and the light sensor 240 are about 7 mm and about 10 nT, respectively. The distance and noise target between the IMU 210 and the microphone 250 are about 3.7 mm and about 6 nT, respectively. The distance and noise target between the IMU 210 and the microcontroller 260 are about 1.6 mm and about 90 nT. It is envisaged these values have a degree of error of about ±20%, preferably 10% and more preferably 5%.

In further reference to FIG. 2A, off-board power supplies 280 are operably in communication with the microcontroller 260. The off-board power supplies 280 include but are not limited to a core and I/O, USB and battery back-up. Each of these devices operates at or below about 3.6V with a 10% degree of error. Separately, the microcontroller 260 is operably in communication with one or more off-board interface 290 including but not limited to a USB, SD/MMC, serial peripheral interface (SPI), inter-IC (I2C), OctoSPI and GPIO.

Figure 2B:
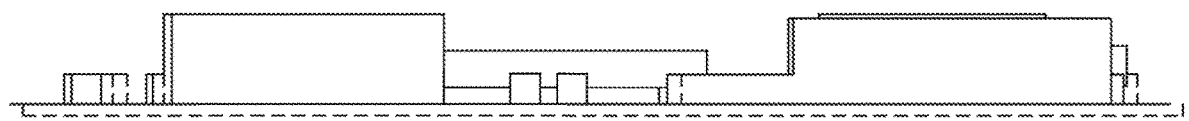
FIG. 2B illustrates a side view of FIG. 2A.

According to another embodiment of the aspect illustrated in FIG. 2A, a populated view of the IC with one or more capacitors on the board is shown in FIG. 2B. It is envisaged that the number of capacitors is contingent upon the power necessary to be generated.

Figure 2C:
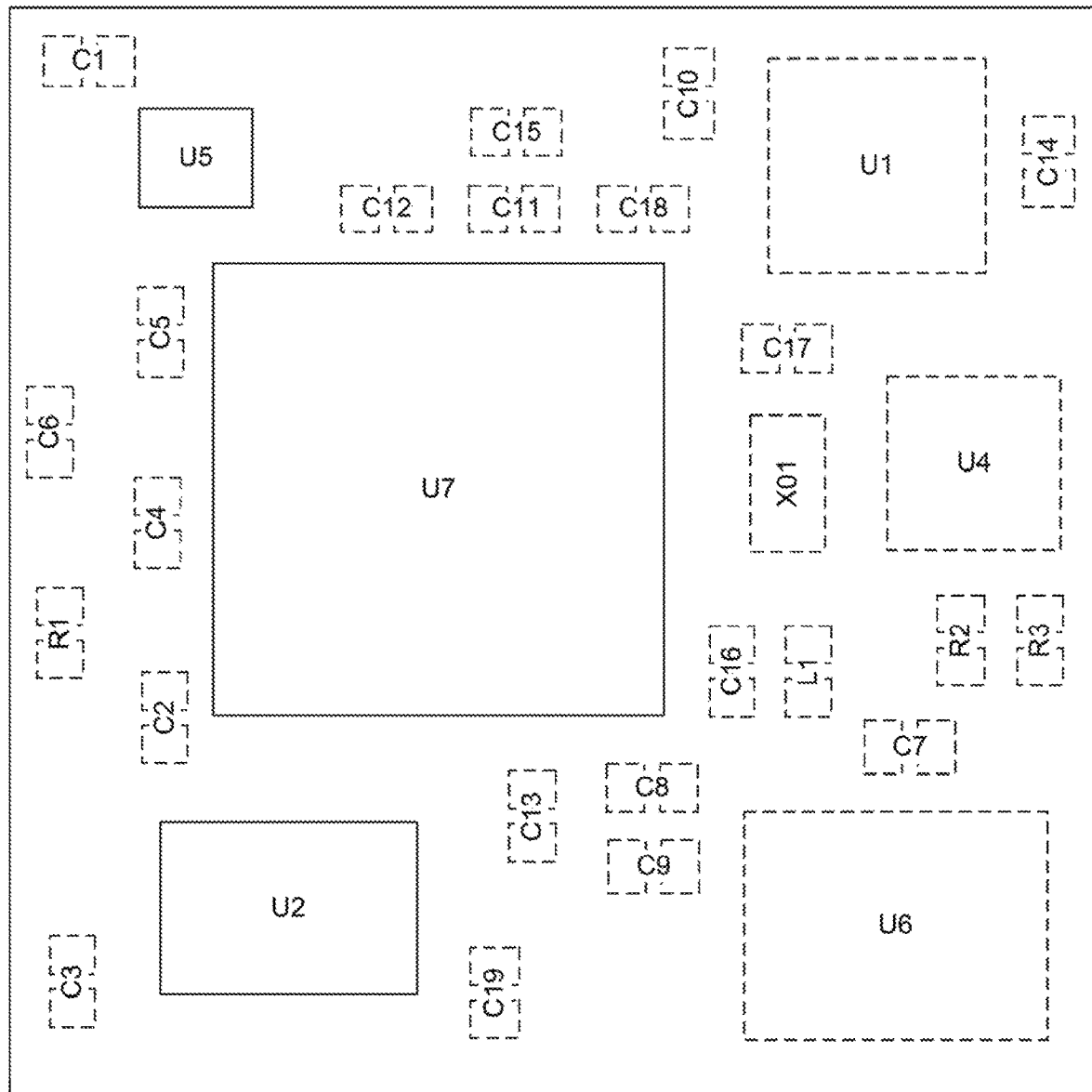
FIG. 2C illustrates a top view of FIG. 2A including capacitors on the board according to an exemplary embodiment of this aspect.

Even further, FIG. 2C illustrates a side view of FIG. 2A. FIG. 2C exemplarily illustrates one or more sensors in reference to the microcontroller, an oscillator, and one or more capacitors.

Heuristic Event Detection

Figure 3A:
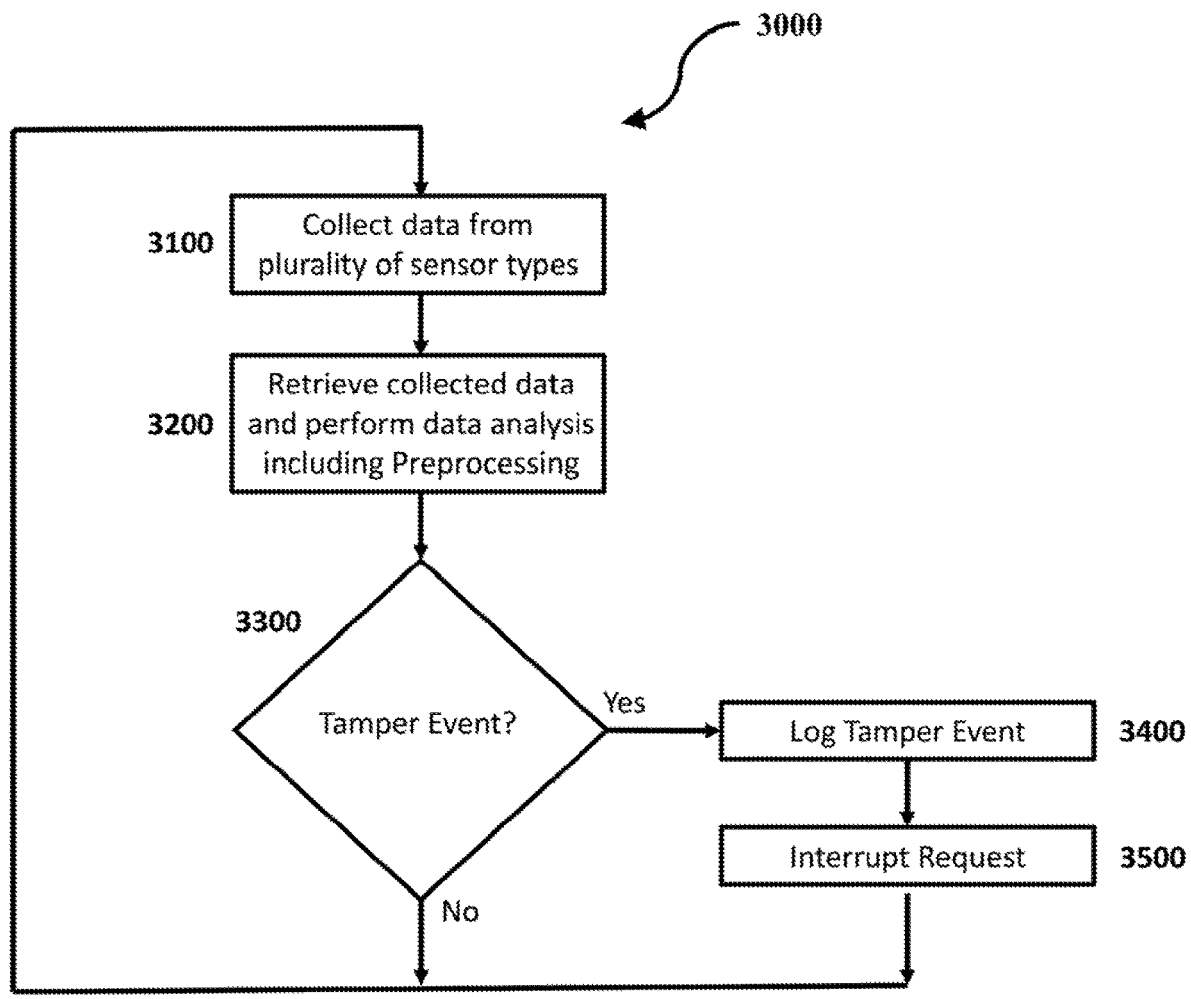
FIG. 3A illustrates a flowchart illustrating an exemplary method of detecting a tamper event in accordance with aspects of the present application.

According to another aspect of the application in reference to FIG. 3A, a method of monitoring and identifying tamper events is provided. This method generally involves heuristic detection. In accordance with an embodiment of this aspect, the method may comprise one or more of a data collection step 3100, a data retrieval and analysis step 3200, a tamper determination step 3300, a tamper event logging step 3400, and an interrupt request step 3500.

In the data collection step 3100, the tamper detection system may collect data from a plurality of sensor types, which may include those described above with reference to FIG. 2A. The collected data may be retrieved by a processor through the use of an input/output interface or module and then processed using data analysis in the data retrieval and analysis step 3200. Data from the different sensor types may be applied to the tamper detection algorithm in the tamper determination step 3300. Prior to or during the tamper determination step 3300, the data from the different sensor types may be appropriately weighted and filtered, as would be appreciated by one skilled in the art. Once the tamper detection algorithm has been executed, the presence of a tamper event is determined. If a tamper event is present, the method may proceed to the tamper event logging step 3400 where occurrence of the tamper event is recorded into memory. In accordance with one aspect of the present application, recordation of the tamper event is saved to local memory of the tamper detection system. Additionally, or alternatively, the tamper event may be saved to memory or other data storage at a remote location. The recordation of the tamper event may include one or more of the date, time, sensor data, and sensor type or types associated with the detected tamper event.

The interrupt request step 3500 may be executed once the presence of the tamper event is determined. The interrupt request may cause the tamper detection system (via the processor and input/output interface, for example) to send an alert to a relevant user of the item to indicate tamper detection, initiate a pre-specified procedure to disable the item of interest, initiate a wipe procedure to delete information that may be stored on the item of interest, and/or provide live location tracking of the item of interest.

Whether or not a tamper event is present at step 3300, the method may return to the data collection step 3100 to continue searching for a new tamper event or to monitor the continuation of a previously detected tamper event. The combination of above steps may be repeated indefinitely or as needed until the method of monitoring and identifying tamper events is terminated or disabled by an authorized user.

Figure 3B:
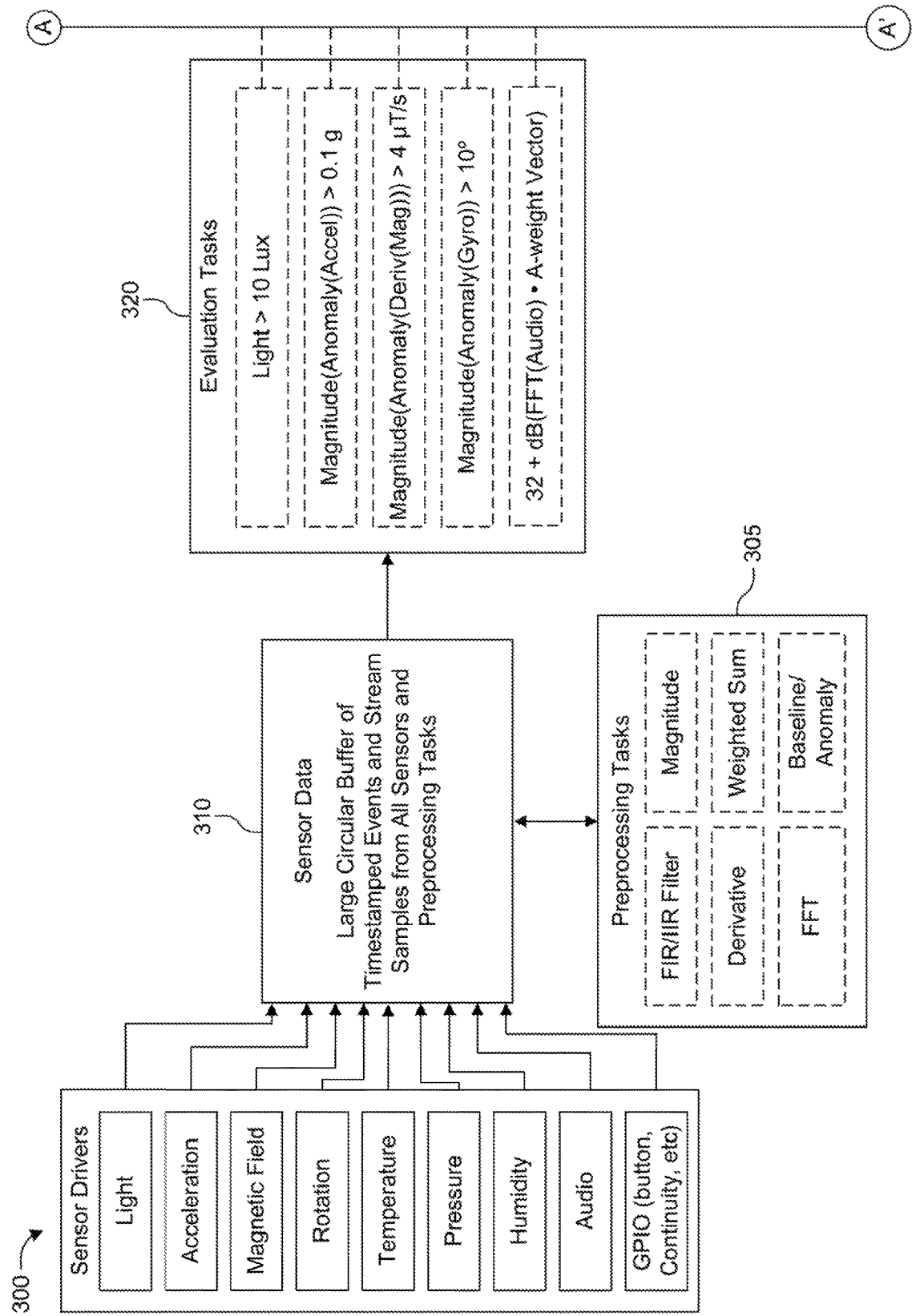
FIG. 3B illustrates a heuristic algorithm for detecting tamper according to an aspect.

According to yet another embodiment, a method and apparatus for detecting tampering is illustrated in FIG. 3B. As provided in FIG. 3B, one or more sensor drivers 300 provides raw data. These raw data provided by these one or more sensors include but are not limited to light, acceleration, magnetic field, rotation, temperature, pressure, humidity and audio.

As shown in FIG. 3B, the sensor data is collected and timestamped in a repository 310. Namely, sensor and analysis streams can be enabled, disabled, and configured independently by the firmware. The raw sensor data may undergo one or more preprocessing tasks 305 in order to transform the data into a form useful for downstream evaluation. The preprocessing tasks may include but not limited to FFT, baseline/anomaly (e.g., high-pass FIR/IIR filter with simplified tuning parameters), weighted sum, derivative, FIR/IIR filter and magnitude.

As further shown in FIG. 3B, the raw data is sent to an evaluation module 320 that conducts one or more evaluation tasks. It is noted that all raw and preprocessed sensor data becomes available to downstream decision tasks through a multi-producer, multi-consumer bounded FIFO. The evaluation tasks performed by the engine may involve simple operations on the preprocessed data. These tasks may include checks against configurable thresholds. Moreover, the tasks may include output decisions or scores. These decisions or scores are collected into a vector. By so doing, other engines in the system can observe the values as well as receive notifications when a score has changed.

As shown in FIG. 3B, the evaluation tasks performed by the evaluation module 320 are directed to light, acceleration, magnetic field, rotation and audio. For example, in one embodiment, the evaluation of light is whether it is greater than 10 lux. In another embodiment, the evaluation of a magnitude of acceleration, with anomaly pre-processing, is whether it is greater than 0.1 g.

In yet another embodiment, the evaluation of a magnitude of magnetic field, with derivative and anomaly pre-processing, is whether its magnitude is changing at a rate greater than 4 µT/s. In yet even another embodiment, the evaluation of magnitude of rotation of the gyroscope, with anomaly pre-processing, is whether it is changing at a rate greater than 10 degrees. In yet even a further embodiment, the evaluation of audio is 32+dB(FFT(Audio)*A-weight factor. The audio is preprocessed with FFT.

Based on the evaluations, a score vector is produced for each evaluation task. For example, the light evaluation returned a value of 0. This means the light did not exceed 10 lux. On the other hand, both the acceleration and magnetic field are shown in FIG. 3B as exceeding their respective thresholds, and therefore returned values of 1. One or more applications may normalize the scores to a range, or at least bias them so that '0' is a critical threshold. It is envisaged that the outputs can be binary and/or numeric.

Next as shown in FIG. 3B, a score evaluation module 330 captures the score vectors from the evaluation task module 320, and determines an appropriate course of action. The score evaluation module is running logic to make these determinations. It is envisaged the score evaluation is based upon custom code for specific applications, but in some embodiments may be as simple as testing whether a specified number of scores exceed zero. The determination may include logging the events or raw data. In another embodiment, the determination may include passing the data to other processors on the host device. In yet another embodiment, the determination may include both of the preceding actions.

As further shown in FIG. 3B, the score evaluation may be transmitted to a user interface (UI) 340. The UI resides on a host device, such as shown in FIG. 1B, and may include a smart device, such as for example, a phone, tablet, wearable or similar medium by which the user is made aware of the alert message. One of the actions that may occur on the UI is entering a state of alert. An alert state can involve customizable audio and visual alerts, such as for example a siren and blinking LEDs as well as their intensities.

Another action of the UI 340 may include sending an alert message to a user. The message may be sent to the UI via a tamper detection application installed on the user's host device.

Yet another action may include clearing the alert via an authenticated user. Namely, subsequent to a false positive and/or true tamper detection, the user may wish to silence the alert. This may be necessary based on the user's current locations. For example, if the user is at a library or in a business meeting.

Yet even another action of the UI is the ability to view and export the event and data logs. This may be useful to preserve a record of all events and means by which the alert is triggered. It is envisaged in this application that the transmission is via USB, Bluetooth, wi-fi or cellular.

Figure 3B:
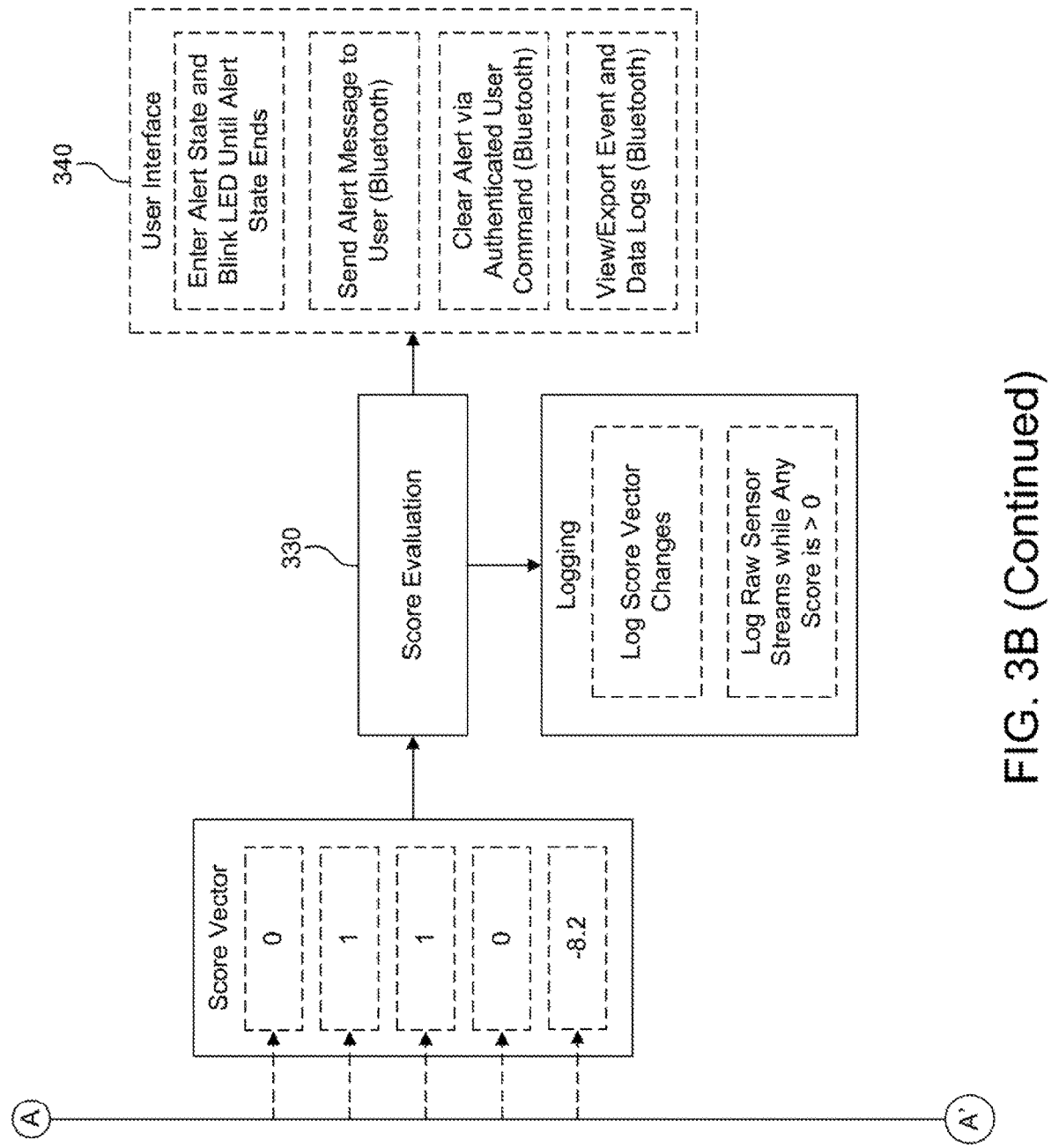
Figure 4A:
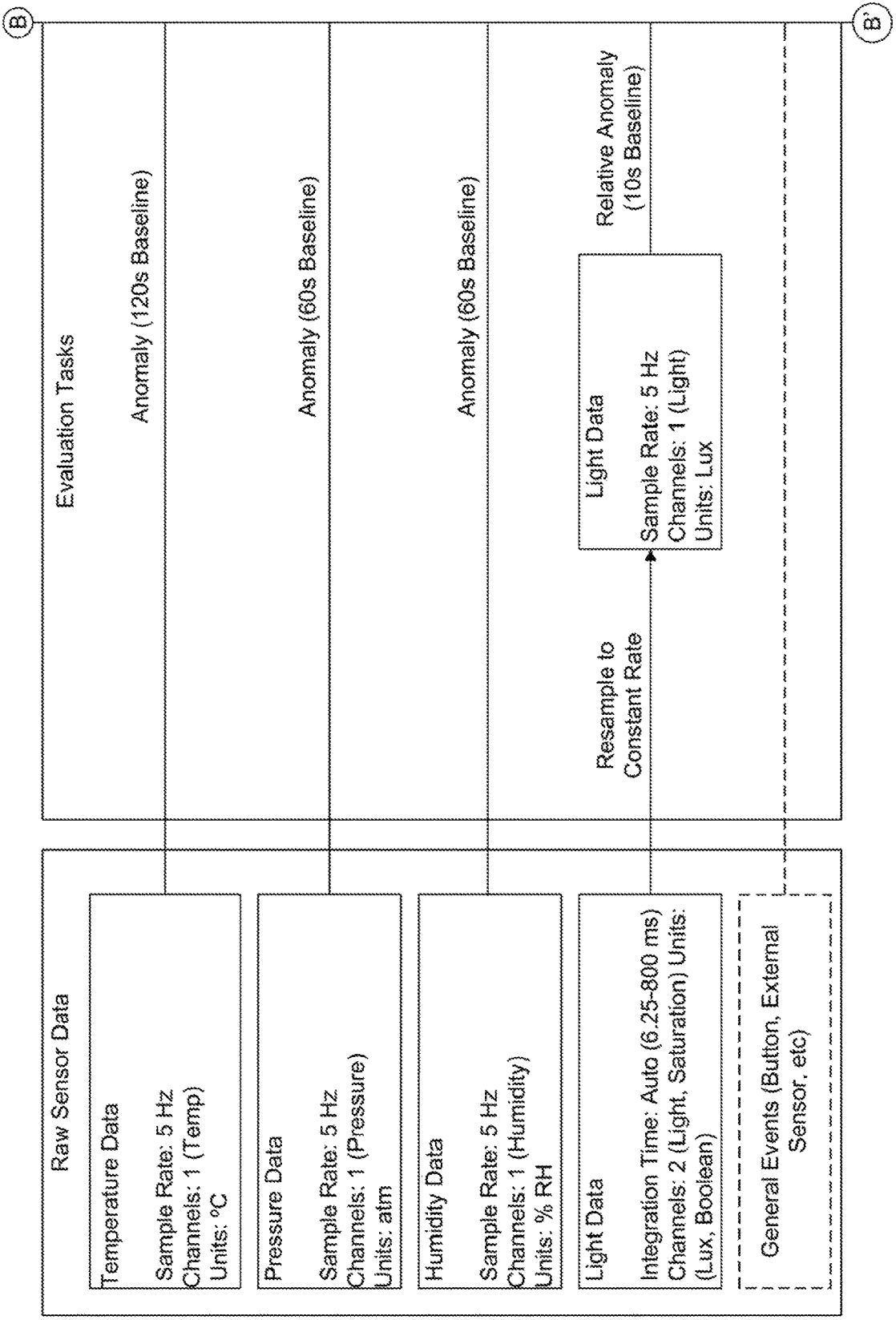
FIGS. 4A-D illustrate different sensing profile embodiments ranging from a closed container, controlled access, drawer, and open access in reference to the heuristic algorithm aspect.
Figure 4A:
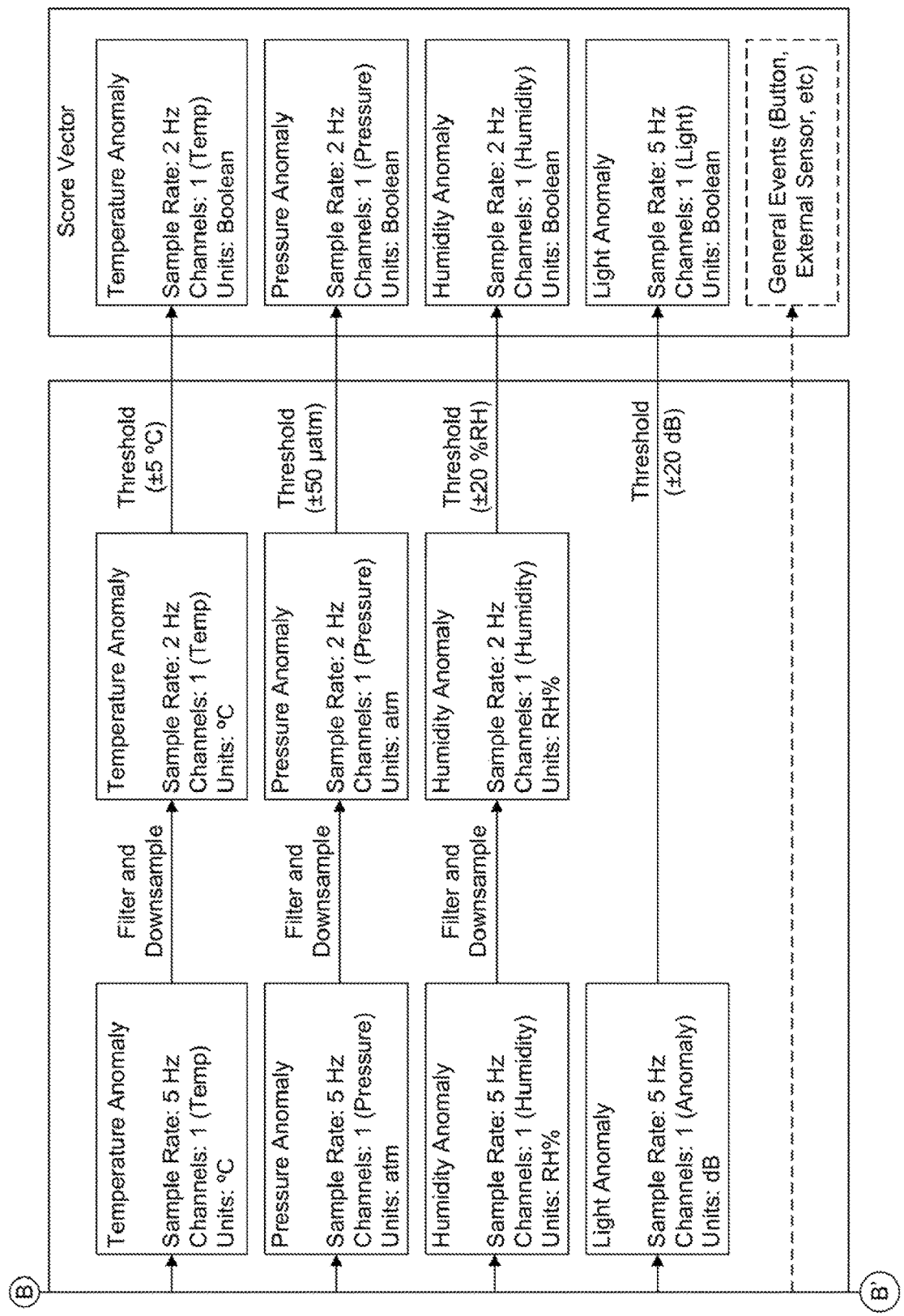

According to an embodiment of this aspect, it is envisaged that the sensing profile of the modules as exemplarily described above depends upon the environment and location of the tamper detection device. For example, FIGS. 4A-D illustrate different sensing profiles ranging from a closed container, controlled access, drawer, and open access. The actions illustrated in FIGS. 4A-D are similar to the actions described in relations to reference elements 300, 305, 310 and 320 depicted in FIG. 3. As illustrated in FIG. 4A, the exemplary sensing profile is for devices inside closed containers. Closed containers may include but are not limited to personal consumer articles such as a bag, briefcase, wallet, or suitcase. In essence, the container is expected to be mobile but in a closed arrangement. The ambient environment is not expected to rapidly change.

In FIG. 4A, the raw sensor data includes temperature data, pressure data, humidity data, light data and the like. It is envisaged the sensors collect data at low data rates to reduce power consumption. However, once a tamper event is detected, one or more, and preferably all, sensors are enabled and operate at a higher data rate for logging data attributed to the tamper event. It is envisaged that one or more of the sensors may be sampled less frequently than others in view of power consumption requirements and the sensing profile.

As further shown in FIG. 4A, the raw sensor data of one or more sensors passes through an anomaly in the evaluation task. One or more sensors may be resampled (e.g., light data) in the evaluation task. The anomalies are subsequently filtered and down sampled. Further, the data is compared against a predetermined threshold. A score vector takes this information into consideration.

Figure 4B:
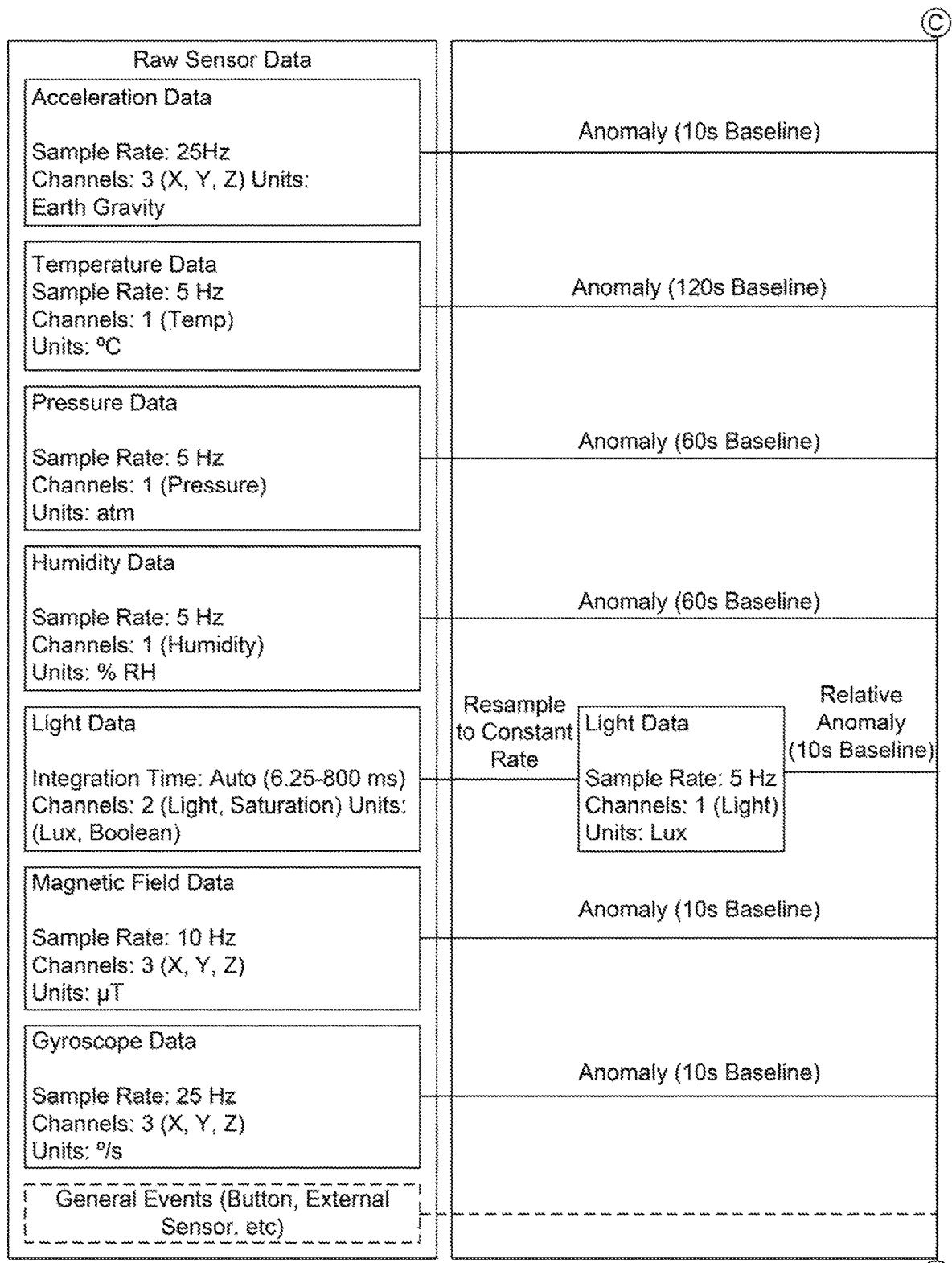
Figure 4B:
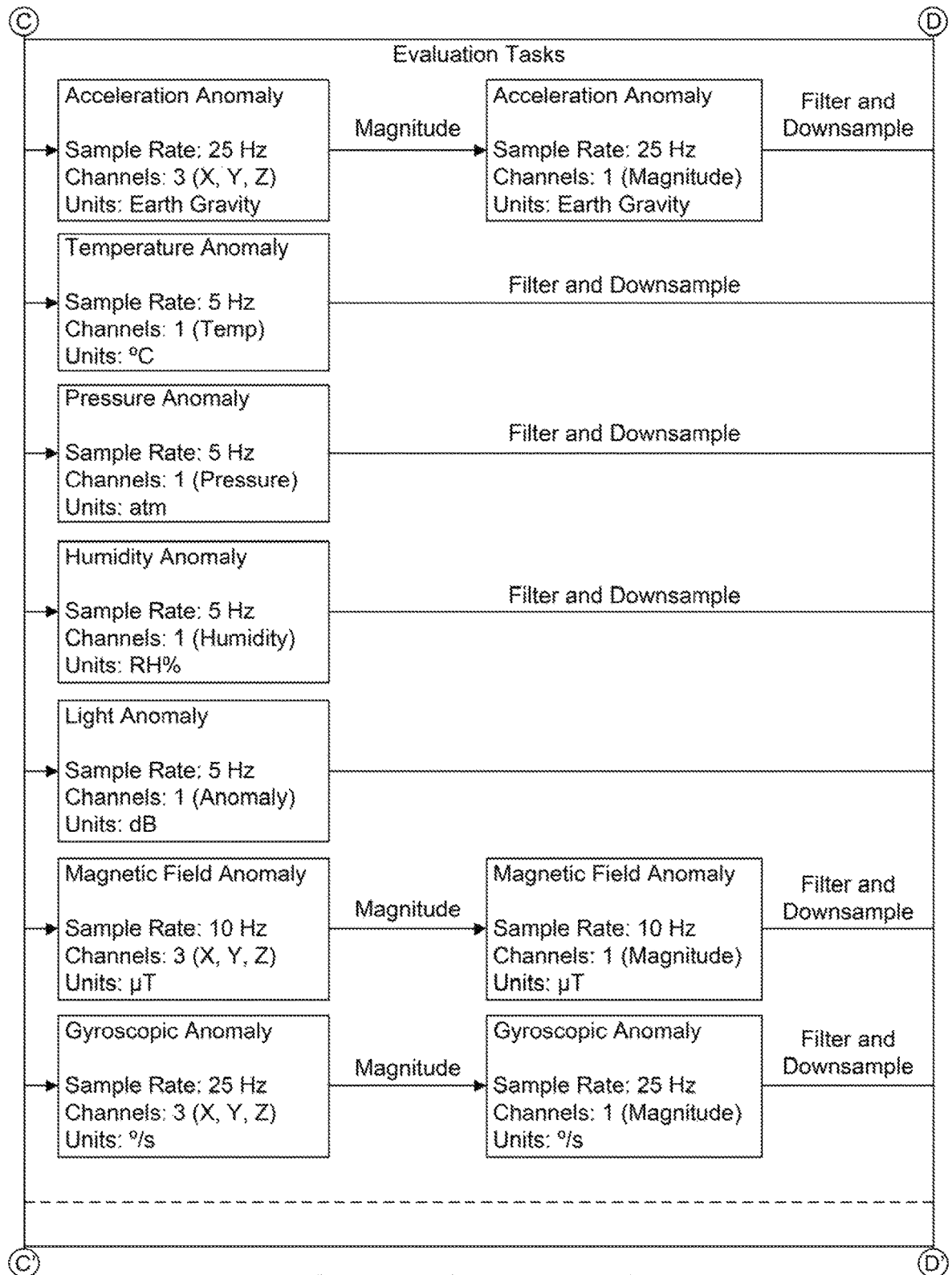
Figure 4B:
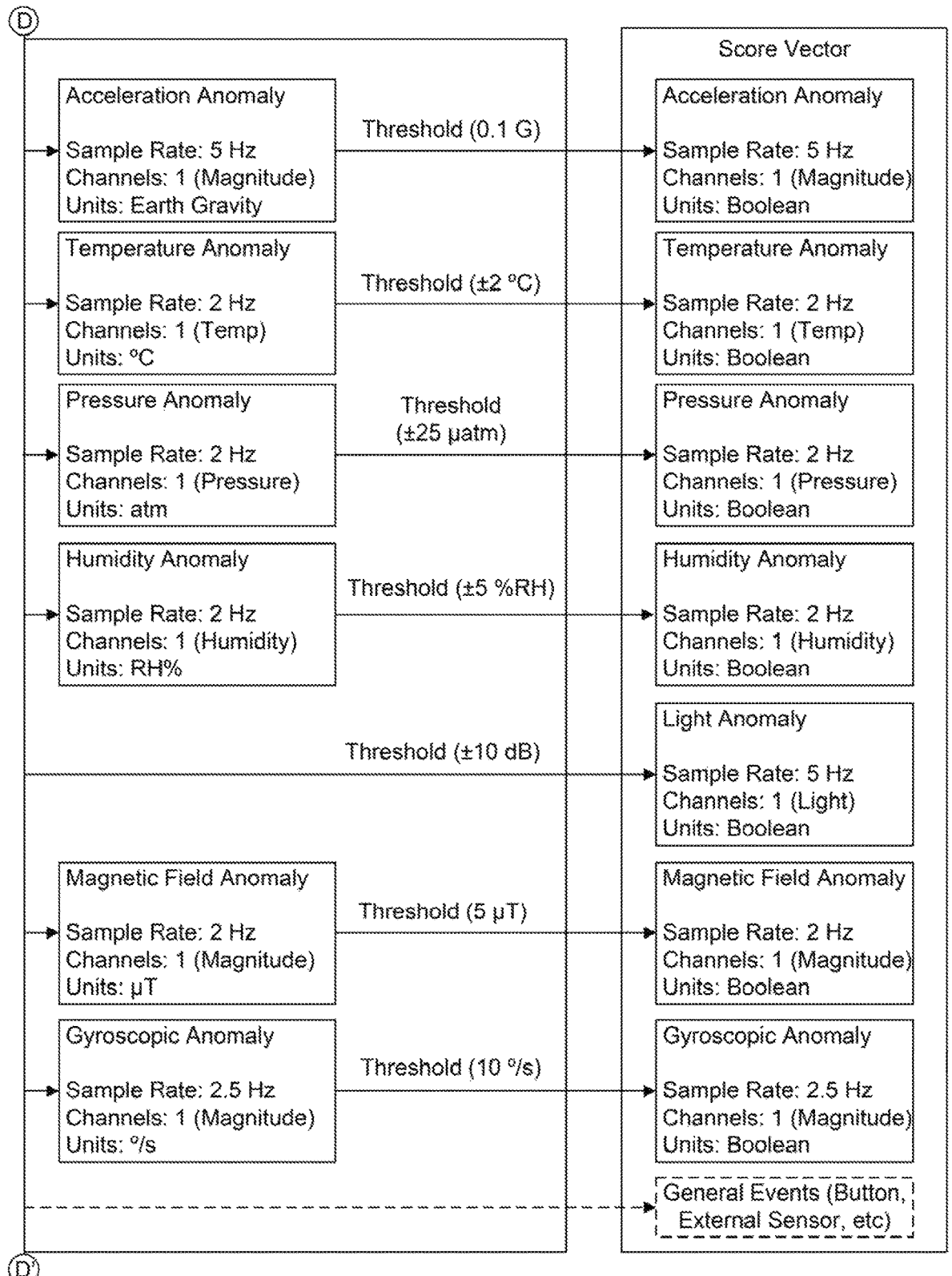

FIG. 4B illustrates a controlled access sensing profile. This profile is envisaged for devices in tightly-controlled environments. The ambient environment is not expected to rapidly change. These environments may include a safe, fixed equipment such as ATMs, fuel pumps, telecommunications equipment and the like. In addition to the sensors shown in FIG. 4A, FIG. 4B includes an accelerometer, magnetometer and gyroscope for measuring acceleration, magnetic field and rotation, respectively. Similar actions are performed in FIG. 4B as described above for FIG. 4A. That is, raw sensor data is collected followed by preprocessing for anomalies before comparing against a threshold and outputting a score vector.

Figure 4C:
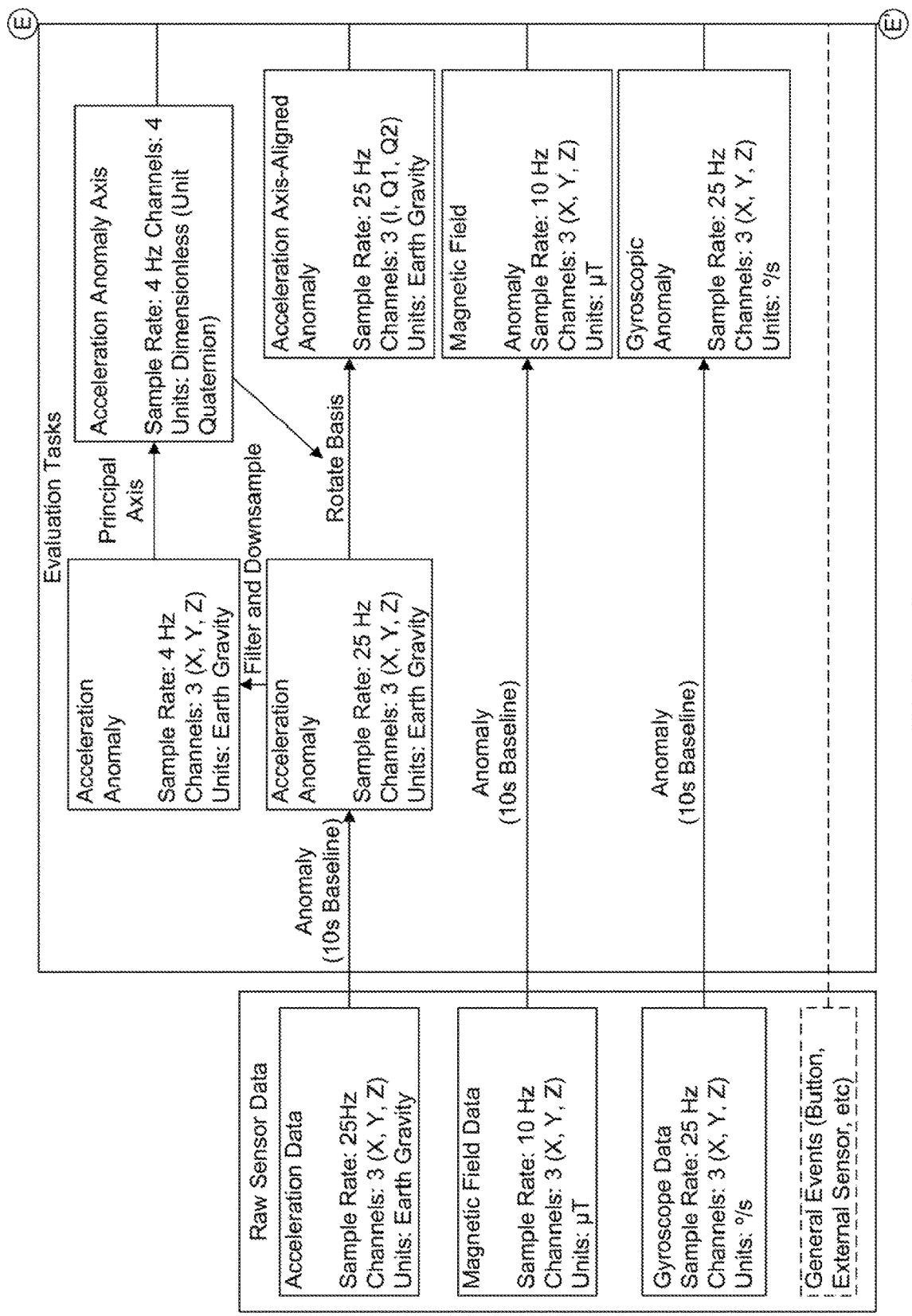
Figure 4C:
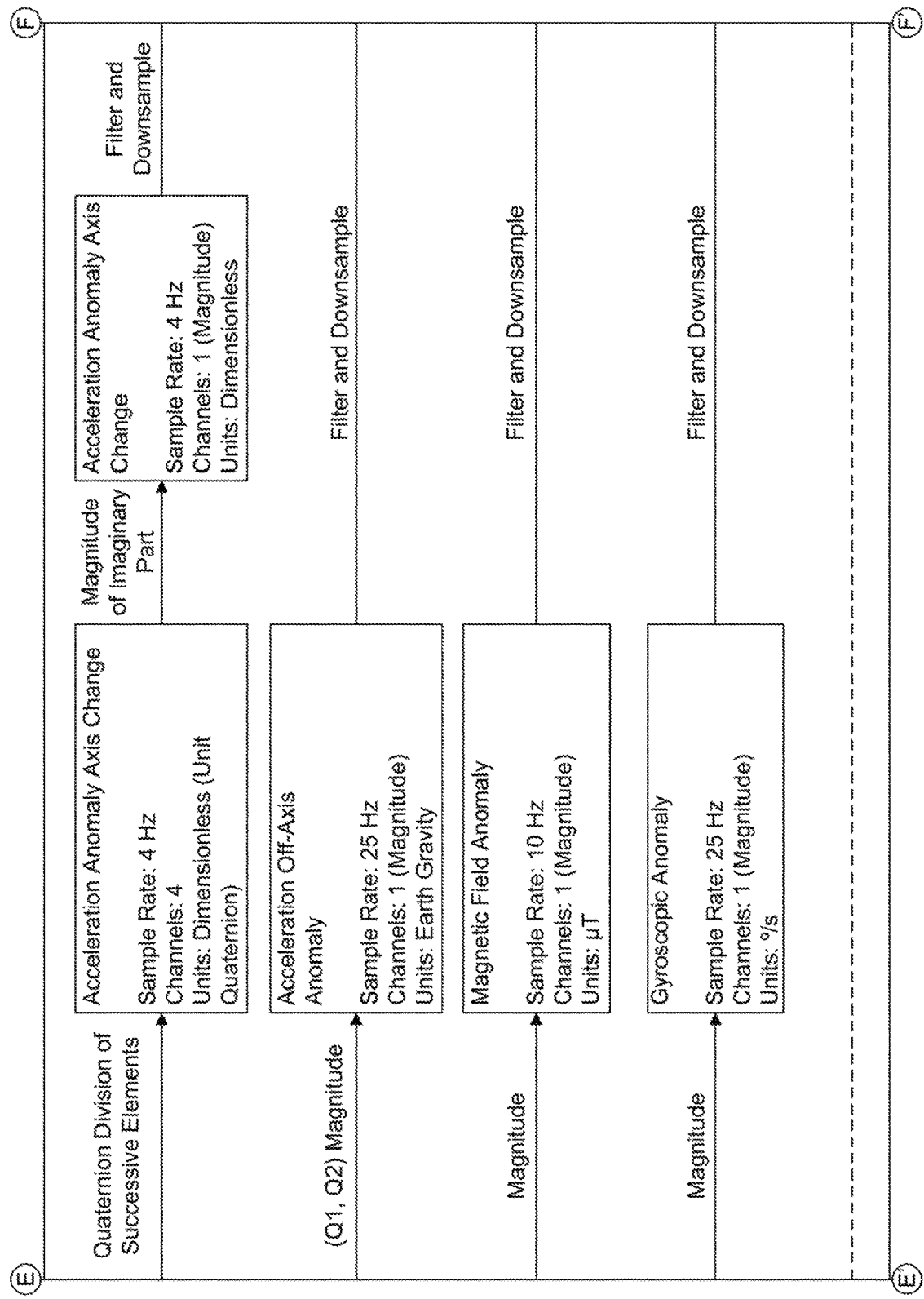
Figure 4C:
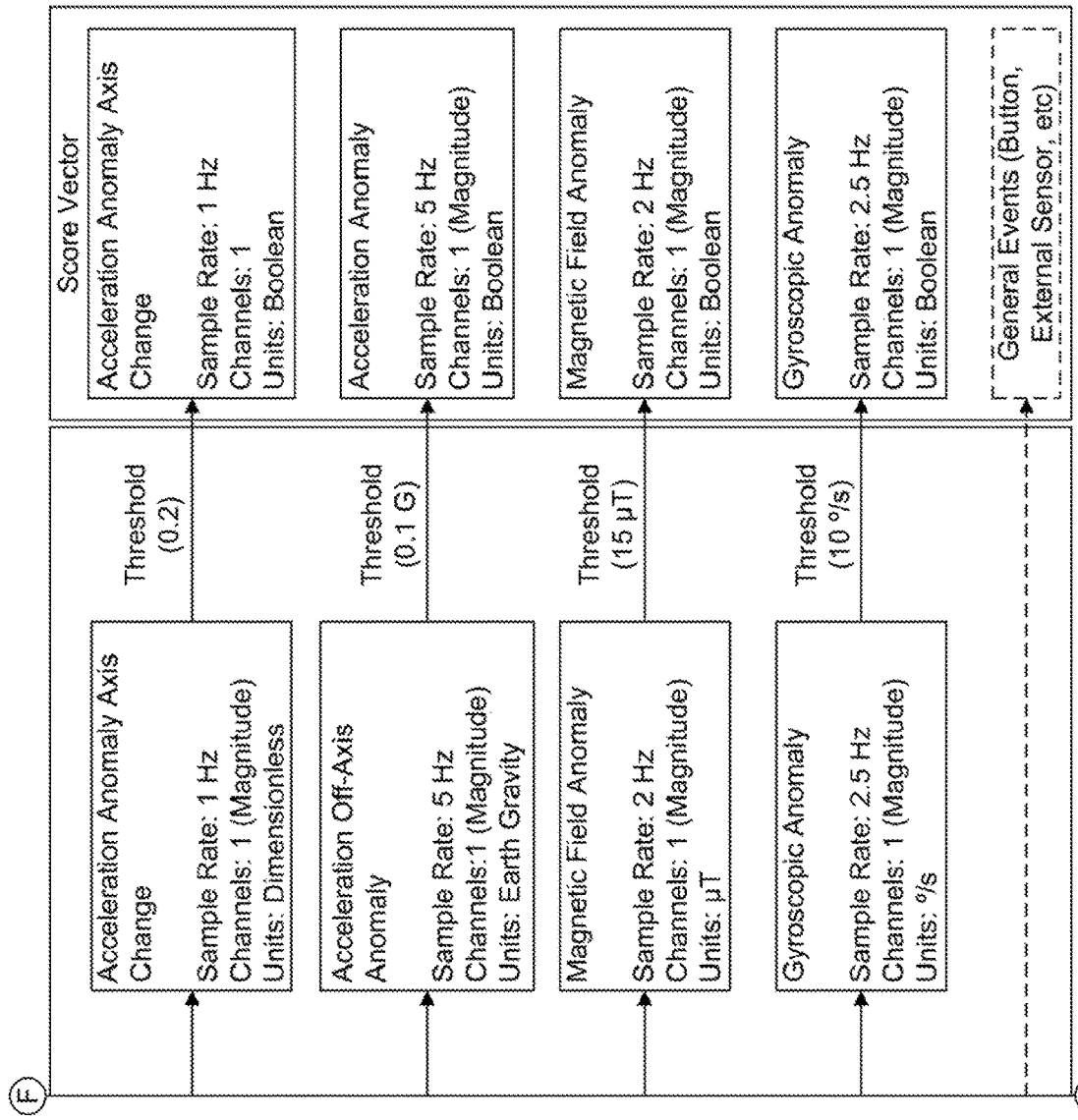

FIG. 4C illustrates a drawer-style sensing profile. This profile is envisaged for tamper devices stored in a location that is expected to be accessed for other purposes. The tamper device would not be manipulated. The sensing profile may include linear slide movement along one consistent axis.

Figure 4D:
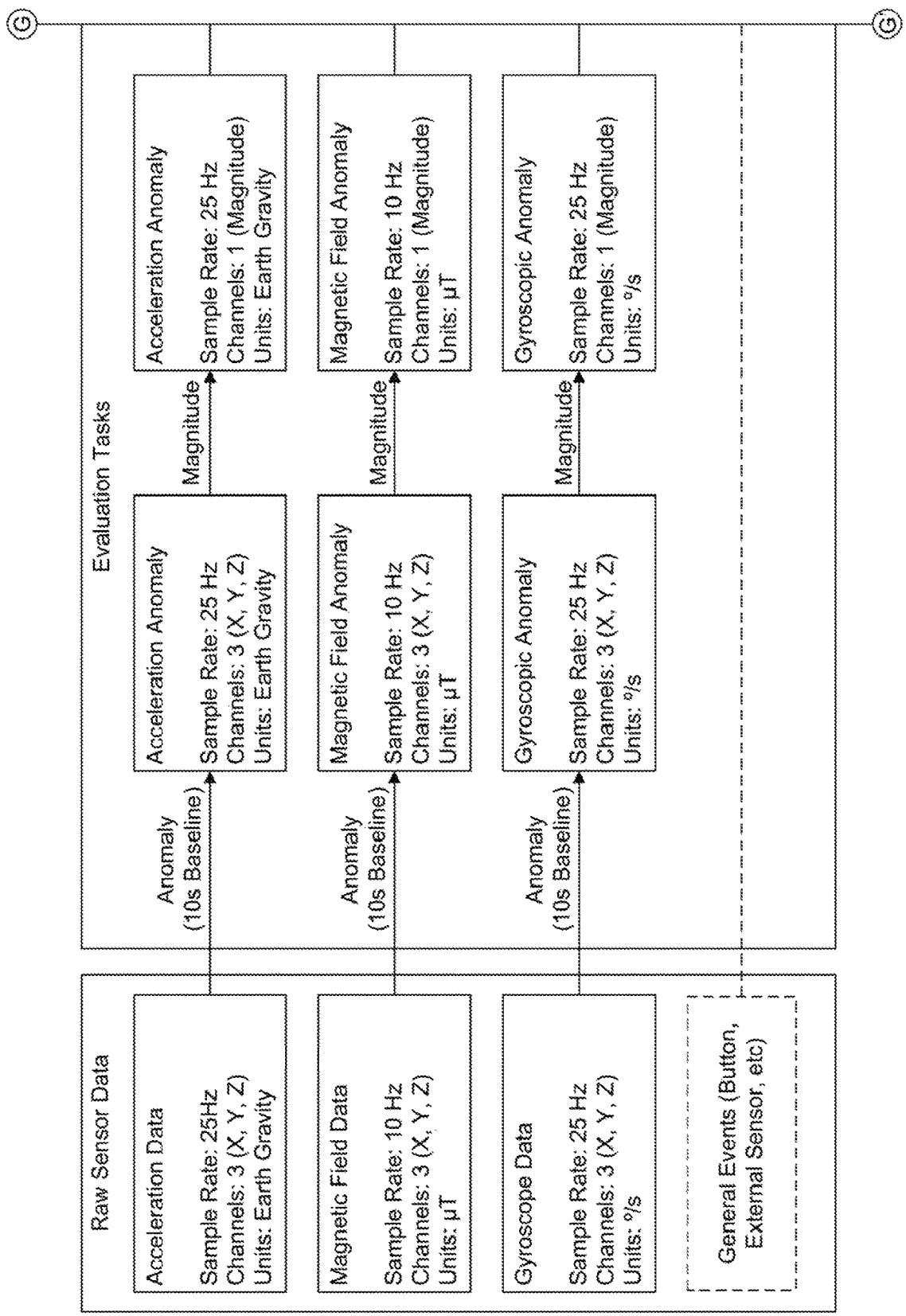
Figure 4D:
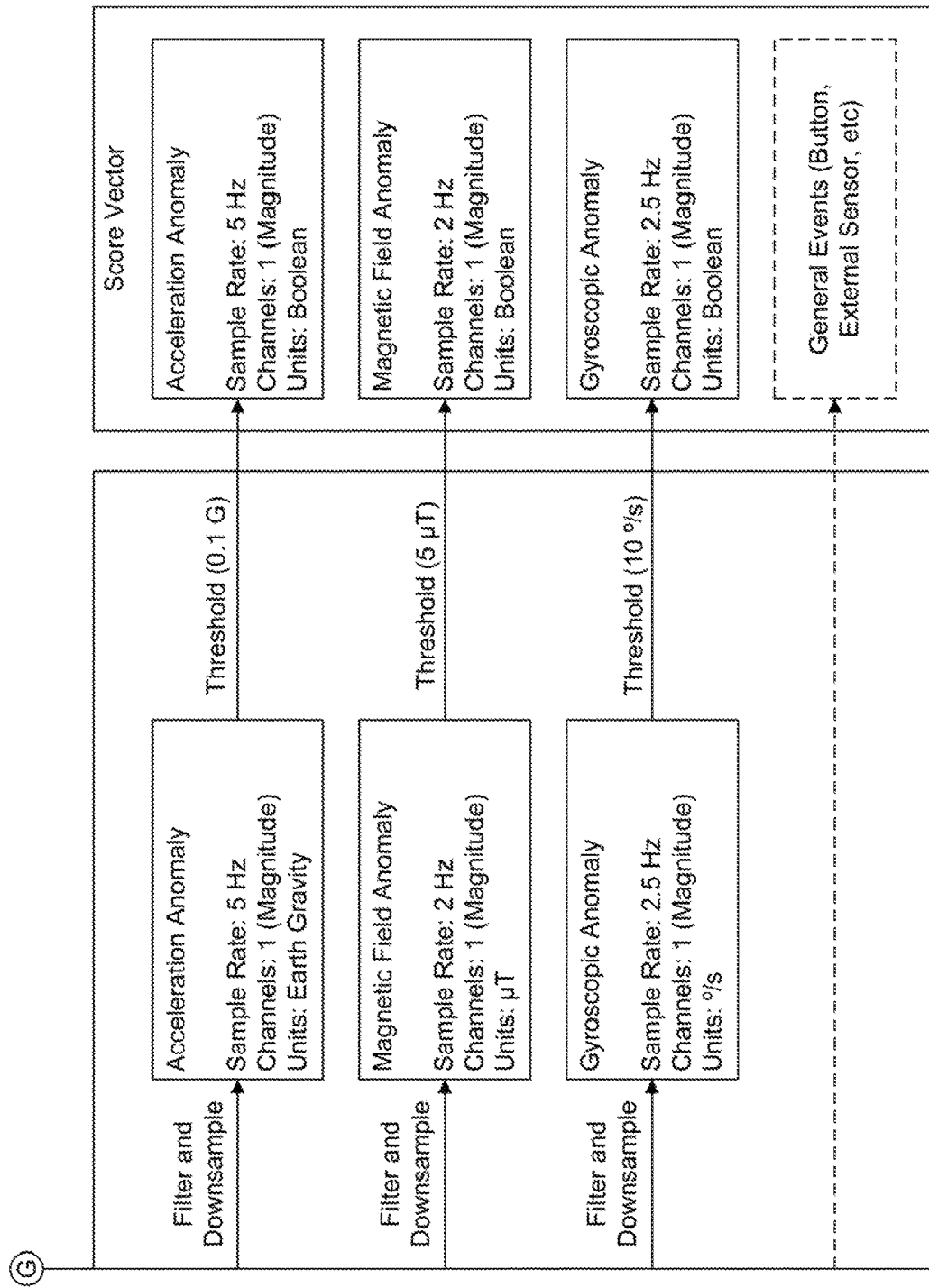

FIG. 4D illustrates an open access sensing profile. This profile is intended for devices in environments where ambient conditions are expected to change. The environment is intended to remain stationary. However, the tamper device should not be manipulated. This profile may include environments such as a desk or bookshelf.

Methods and Systems of Detecting Tamper Events with Machine Learning Algorithms

Figure 5A:
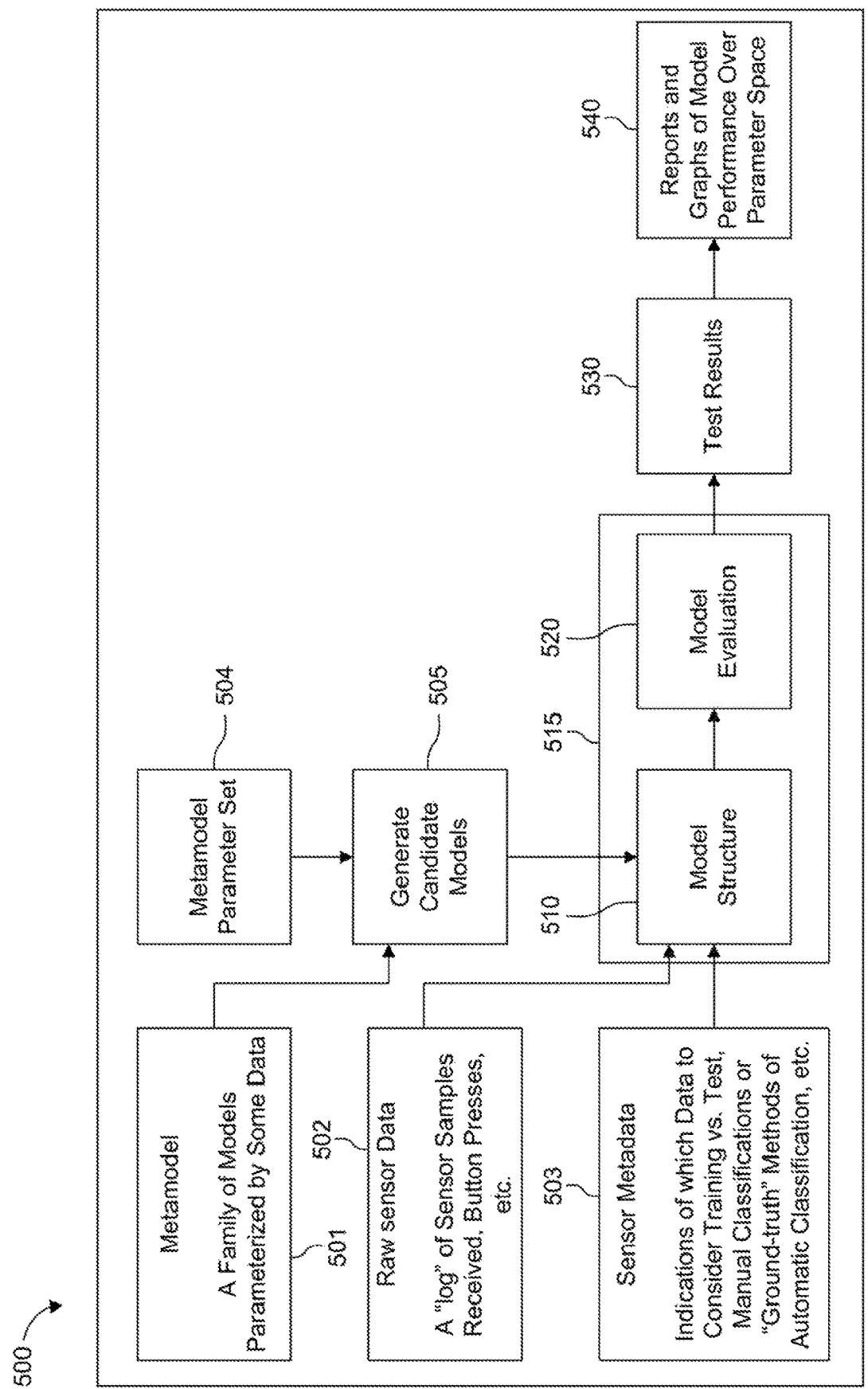
FIG. 5A illustrates a method of evaluating one or more machine learning algorithms for classifying sensor data according to an aspect of the application.

According to another aspect of the application, FIG. 5A illustrates an embodiment 550 for evaluating one or more machine learning methods for classifying sensor data. Generally, machine learning is employed when the task is too robust or complex for humans to code directly. That is, the task would be impossible for humans to evaluate and configure code based upon the data set.

Machine learning aids in recognizing patterns such as for example specific types of tamper events in a particular environment/sensing profile. The sensing profiles described above in this application include one or more of closed access, controlled access, drawer with motion in one axis, and open access. Machine learning also aids in recognizing anomalies including for example unusual sequences of events or sensor readings in a particular environment. Machine learning further aids in predicting future events such as for example time, duration, location and extent of tamper-related events.

As shown in FIG. 5A, metamodel 501 includes a family of models that are parameterized by data. Moreover, the metamodel parameter set 504 requires an analyst wishing to evaluate a class of models to define the class and set of parameters that can be varied as inputs to that model.

Based on the provided model descriptions, the metamodel family and metamodel parameter set, concrete candidate models are generated 505. Each candidate model is evaluated and scored according to the model evaluation block 520. The model structure 510 and model evaluation 520 are described in more detail below with regard to the flow chart 515 of FIG. 5B. After the one or more models are used for making predictions, the prediction results are individually scored resulting in the test results 530. It is envisaged according to some embodiments that reports and graphs are prepared in view of the test results.

It is envisaged that one or more of the following exemplary analysis may use this process. One analysis may include generating receiver operating characteristic (ROC) curves for each of several tamper/no-tamper classification models including plots of false-positives versus false-negatives. Another analysis may include computing classification accuracy for several situational classification models. The output categories might include one or more of "stationary," "in a moving car," "in an idle car," in an airplane," "on a boat," "in hand," "in a backpack," etc. Yet another analysis may include computing change in accuracy for some specific model as a function of changes in the quality, quantity, and preconditioning of the input data. This may help answer queries directed to the impact of reducing sampling rates to save power.

As previously described above, raw sensor data 502 includes a log of received sensor samples. Raw sensor data 502 provides an input to preprocessing 510c. Sensor data is generally of the highest quality available. Lower quality data is expected in power constrained applications.

Figure 5B:
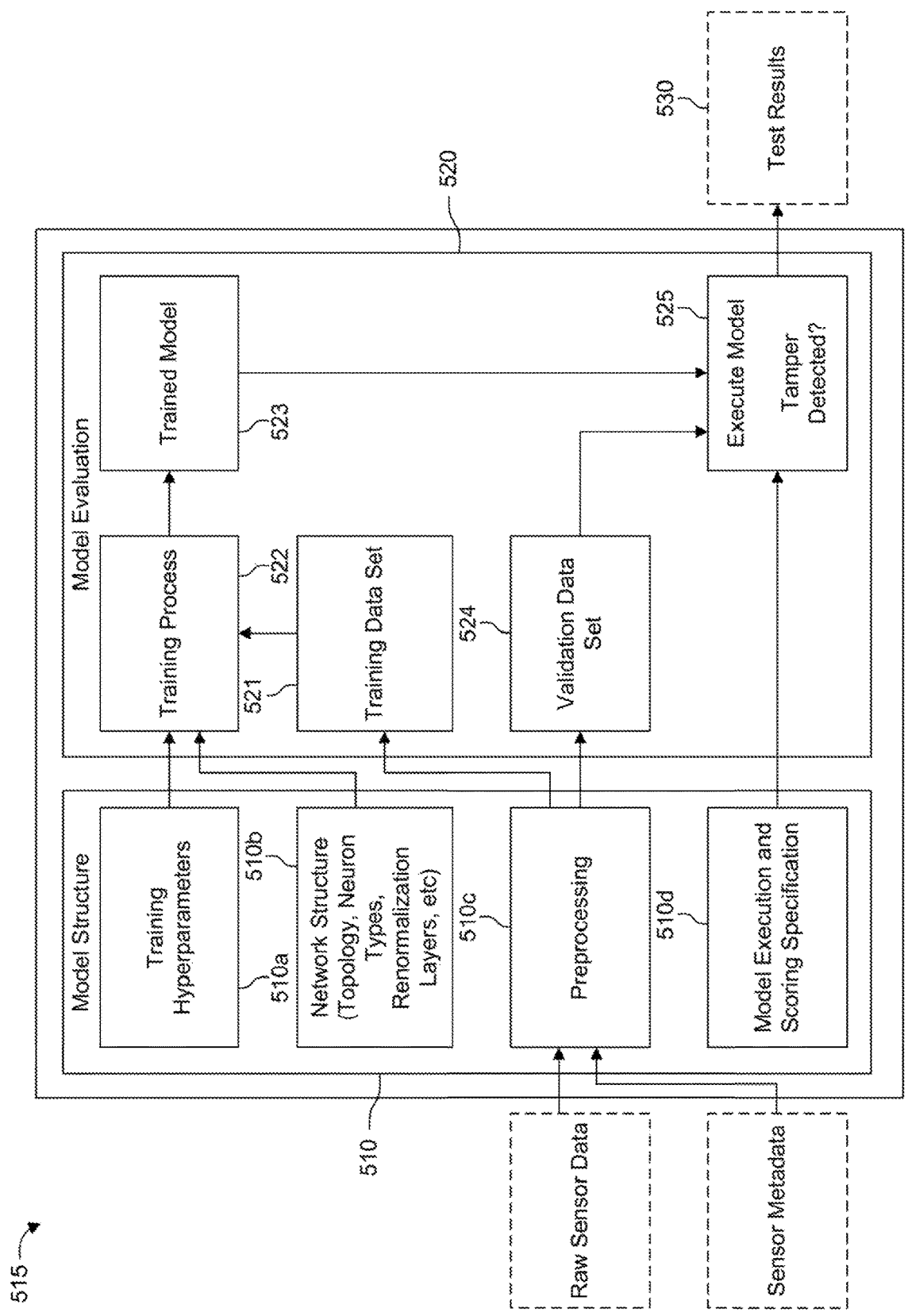
FIG. 5B illustrates an exemplary embodiment directed to training a model structure for detecting tamper events using an exemplary machine learning algorithm.

FIG. 5B illustrates the model structure 510 and model evaluation 520 in block 515 introduced in FIG. 5A. FIG. 5B illustrates an exemplary embodiment directed to training a model structure 510 for detecting tamper events using machine learning algorithms with an applied training data set 521.

According to an embodiment of this aspect, training hyperparameters 510a are set before learning occurs on the model structure 510. Hyperparameters may include the number of hidden layers, the number of hidden nodes in each layer, the learning rate with various adaptation schemes for the learning rate, the regularization parameters, types of nonlinear activation functions, and whether to use dropout. For deep learning algorithms, the hyperparameters may include a number of layers, layer size, activation function, and the like. If the machine learning algorithm is a support vector machine, the hyperparameters may include the soft margin constant, regularization, and the like. If the machine learning algorithm is a random forest classifier, the hyperparameters can include the complexity (e.g., depth) of trees in the forest, number of predictors at each node when growing the trees, and the like.

The model structure 510 also provides the network structure 510b. The network structure 510b may include characteristics such as structure topology, neuron types, renormalization layers, etc. An artificial neural network may be configured to determine a classification (e.g., type of tamper) or whether one or more sensed values indicate that there is a tamper event) based on input media. An artificial neural network is a network or circuit of artificial neurons or nodes for solving artificial intelligence (AI) problems. Such artificial networks may be used for predictive modeling.

Prediction models employed in one or more embodiments may be and/or include one or more neural networks (e.g., deep neural networks, artificial neural networks, or other neural networks), other machine learning models, or other prediction models. As an example, the neural networks referred to variously herein may be based on a large collection of neural units (or artificial neurons). Neural networks may loosely mimic the manner in which a biological brain works (e.g., via large clusters of biological neurons connected by axons). Each neural unit of a neural network may be connected with many other neural units of the neural network. Such connections may be enforcing or inhibitory, in their effect on the activation state of connected neural units. These neural network systems may be self-learning and trained, rather than explicitly programmed, and can perform significantly better in certain areas of problem solving, as compared to traditional computer programs. In some embodiments, neural networks may include multiple layers (e.g., where a signal path traverses from input layers to output layers). In some embodiments, back propagation techniques may be utilized to train the neural networks, where forward stimulation is used to reset weights on the "front" neural units. In some embodiments, stimulation and inhibition for neural networks may be more free-flowing, with connections interacting in a more chaotic and complex fashion.

A convolutional neural network (CNN) is a sequence of hidden layers, such as convolutional layers interspersed with activation functions. Typical layers of a CNN are thus a convolutional layer, an activation layer, batch normalization, and a pooling layer. Each output from one of these layers is an input for a next layer in the stack, the next layer being, e.g., another one of the same layer or a different layer. For example, a CNN may have two sequential convolutional layers. In another example, a pooling layer may follow a convolutional layer. When many hidden, convolutional layers are combined, this is called deep stacking.

Convolutional layers apply a convolution operation to an input to pass a result to the next layer. That is, these layers may operate by convolving a filter matrix with an input image from the light sensor, the filter being otherwise known as a kernel or receptive field. Filter matrices may be based on randomly assigned numbers that get adjusted over a certain number of iterations with the help of a backpropagation technique. Filters may be overlaid as small lenses on parts, portions, or features of the image, and use of such filters lends to the mathematics behind performed matching to break down the image. Stated differently, by moving the filter around to different places in the image, the CNN may find different values for how well that filter matches at that position. For example, the filter may be slid over the image spatially to compute dot products after each slide iteration. From this matrix multiplication, a result is summed onto a feature map.

After each convolutional layer, it is conventional to apply a nonlinear (activation) layer immediately afterward, such as a ReLU, Softmax, Sigmoid, tanh, Softmax, and/or Leaky layer. For example, ReLUs may be used to change negative values (e.g., from the filtered images) to zero.

In some embodiments, a batch normalization layer may be used. The batch normalization layer may be used to normalize an input layer by adjusting and scaling the activations. Batch normalization may exist before or after an activation layer. To increase the stability of a neural network, batch normalization normalizes the output of a previous activation layer by subtracting the batch mean and dividing by the batch standard deviation.

The structure of the CNN (e.g., number of layers, types of layers, connectivity between layers, and one or more other structural aspects) may be selected, and then the parameters of each layer may be determined by training. Some embodiments may train the CNN by dividing a training data set into a training set and an evaluation set and then by using the training set. Training prediction models with known data improves accuracy and quality of outputs. Training data may be derived from any number of sources, as will be discussed in further detail below.

Generally, the training data set is derived from the above-described raw sensor data. The model specification 510 receives and preprocesses 510C the raw sensor data obtained by the IC tamper module. In some embodiments, the training data set may be obtained from raw sensor data as well as from a prediction database comprising hundreds, thousands, or even millions of events.

FIG. 5B also depicts Model Execution and Scoring Specification 510d in the Model Structure 510. These elements are employed to assign weights to specific parameters. The parameters may include one or more thresholds assigned to the one or more sensors of the integrated module.

Figure 5C:
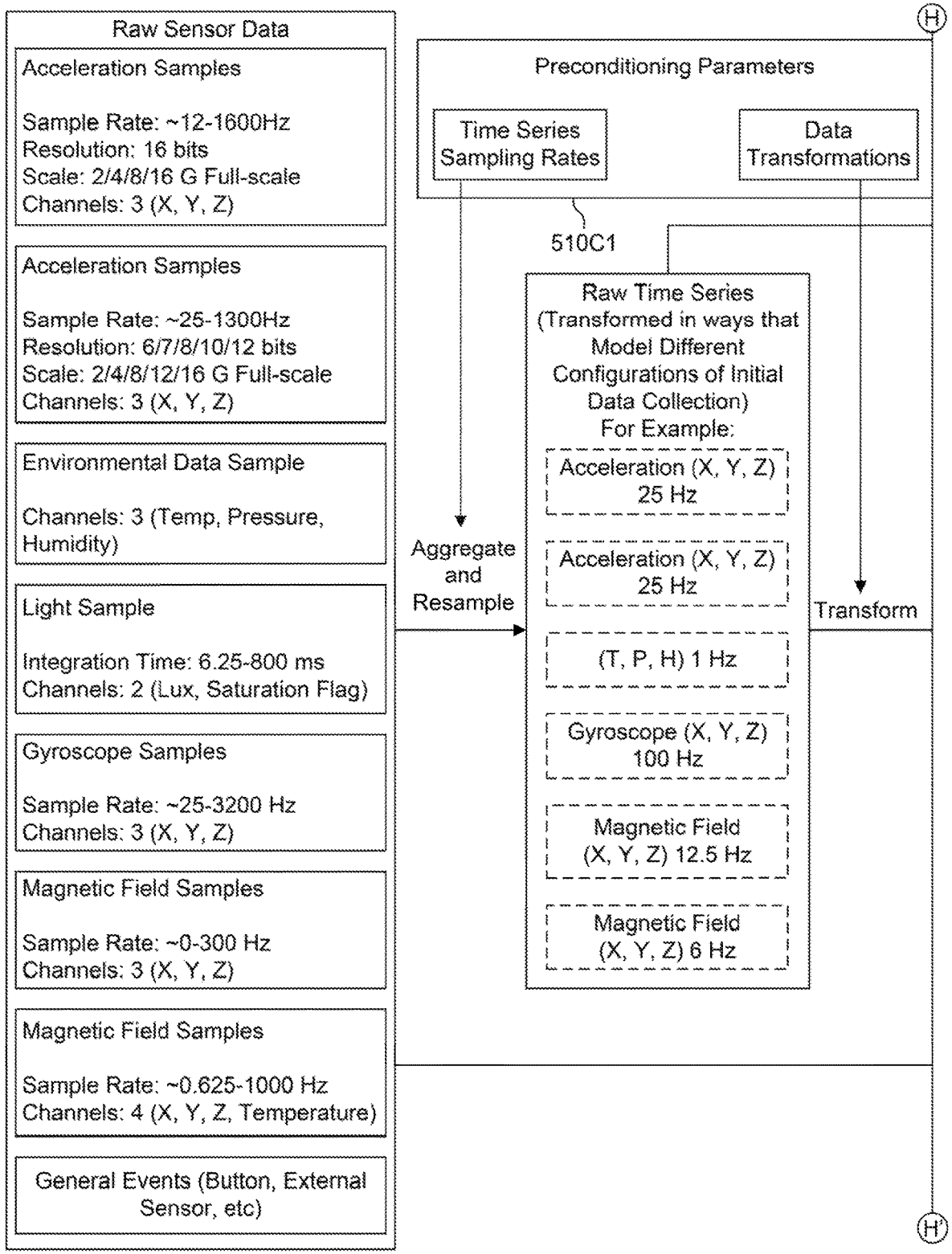
FIG. 5C illustrates an exemplary method for preprocessing sensor data employed for the training model depicted in FIG. 5B.
Figure 5C:
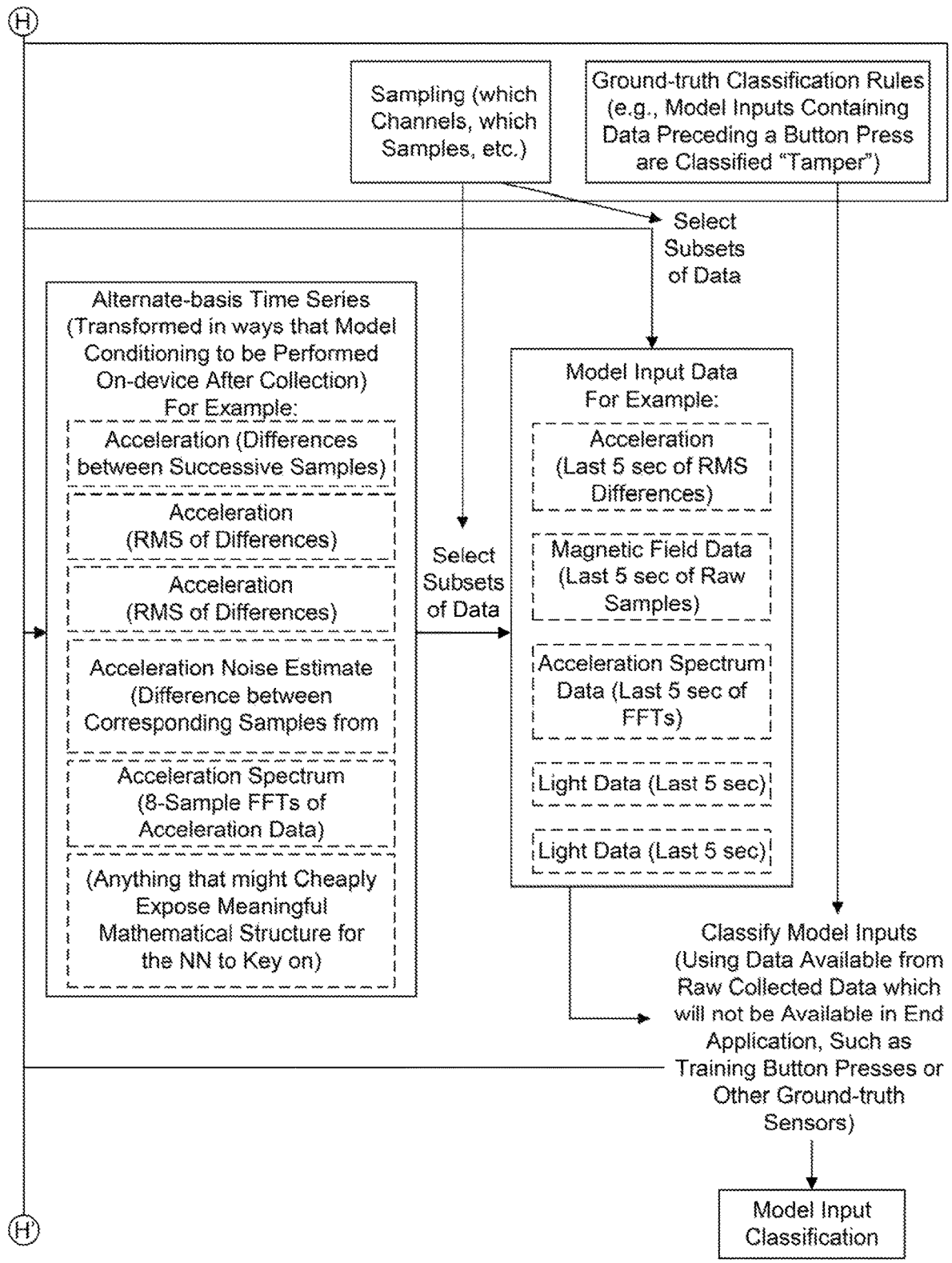

According to an embodiment as depicted in FIG. 5C, aspects of preprocessing 510C the model structure includes Preconditioning Parameters 510C1. Preconditioning Parameters 510C1 include time series sampling rates, data transformations, sampling and ground-truth classification rules.

An initial step of preprocessing 510C1 involves aggregating all of the input of the raw sensor data and training related meta-data provided as inputs to the model structure. In most applications, power consumption is a concern, so data feeding the model in the deployed application will be collected at a lower sampling rate and in lower power modes that have higher noise floors. One of the initial steps includes taking the received high-quality data collected for training and reducing its quality. Doing so matches expectations in deployed applications.

Next, the raw sensor data goes through a transformation process. It is expected that several kinds of preprocessing transformation steps involving data transformation will improve the accuracy of predictions made via machine learning. Exemplary transformations include operations that can be implemented on the microcontroller in real-time, and which substantially change the mathematical basis of the data in ways that expose properties that might be useful for making decisions.

Next, a subset of the data is selected. It is expected that reducing the amount of data fed into the model, if it can be done without impacting performance, has direct benefit to computation time and power consumption. Such reductions may potentially simplify the model itself, and reduce the amount of computation required to precondition data for the model. Reductions may include throwing out entire data channels, or selecting arbitrary subsets of existing data series (for example: every 10th data point, or the most recent 5 seconds of data). Ideal candidates would be operations that can feasibly be implemented on the microcontroller in real-time, and which substantially change the mathematical basis of the data in ways that expose properties that might be useful for making decisions.

The pre-processed data are transmitted for model evaluation 520, and referred to as a training data set 521. It is envisaged that a percentage of the raw sensor data is used as the training data set. Another percentage of the raw sensor data is used as test data set. The training data set 521 can include but is not limited to data from one or more sensor drivers. The raw data provided by these one or more sensors include but are not limited to light, acceleration, magnetic field, rotation, temperature, pressure, humidity and audio.

Subsequently, model inputs are classified. Classification is performed using data available from raw collected data. In some instances, this may include data not available in end applications. Unavailable data includes training button presses or other ground-truth sensors.

Further, the training data set 521 is sent to the model evaluation module 520. Here, the data set may be split between training and validation data sets 521, and a validation data set 524. Executing the model 525 employs both the training data set and the validation data set. For example, some embodiments may use 80% of the preprocessed sensor data for training and/or validation, and the other 20% may be used for validation and/or testing. The validation set may be a subset of the training data, which is kept hidden from the model to test accuracy of the model. The test set may be a dataset, which is new to the model to test accuracy of the trained model.

In an embodiment of this aspect directed to detecting tamper events with machine learning algorithms, a prediction model may employ a historical dataset. The prediction model can be used to predict candidate parameter values using one or more parameter predictors. Examples of a property of the prior training data include: a total number of training examples, statistical properties of the distribution of training labels over training examples (e.g., a maximum, a minimum, a mean, a mode, a standard deviation, a skew), attributes of a time series of training examples (e.g., time spanned by training examples, statistics of rate changes, Fourier transform frequencies, and date properties such as season, day of week, and time of day), attributes of the entity (e.g., industry category, entity content categorization, etc.)

As further depicted in the exemplary embodiment of FIG. 5B, a network, e.g., neural network, of the model structure 510 is trained employing the above-mentioned training data set 521. In various embodiments, training examples in the training data include input features of a user of the online system; input features; and ground truth data. The training module 522 iteratively trains a machine learning model using training examples to minimize an error between a prediction and the ground truth data.

In one or more embodiments, the training module 522 of FIG. 5B trains a model and then validates the trained model via supervised learning, unsupervised learning, semi-supervised learning, reinforcement learning, transduction learning, or the learning to learn algorithm.

Machine learning algorithms are typically organized into a taxonomy based on the desired outcome of the algorithm. Common algorithm types envisaged for use in the instant application include the following:

Supervised Learning: In supervised machine learning, the algorithm generates a function that maps inputs to desired outputs. One standard formulation of the supervised learning task is the classification problem. The learner approximates the behavior of a function which maps a vector into one of several classes by looking at several input-output examples of the function. Examples of supervised machine learning algorithms may include Naïve Bayes, Decision Trees, Boosted Decision Trees, Logistical Regression, Support Vector Machines, Neural Nets, and so forth.

Unsupervised Learning: In unsupervised machine learning, an agent models a set of inputs. Labeled examples are not available. Examples of
unsupervised machine learning techniques include clustering via indexed keyword meta-data or social network link distance. Examples of unsupervised machine learning algorithms may include K-mean Clusters, Nearest Neighbor Rules, Latent Semantic Analysis, and so forth.

Semi-Supervised Learning: semi-supervised machine learning combines both labeled and unlabeled examples to generate an appropriate function or classifier.

Reinforcement Learning: Reinforcement machine learning is where the algorithm learns a policy of how to act given an observation of the world. Every action has some impact in the environment, and the environment provides feedback that guides the reinforcement learning algorithm.

Transduction Learning: Similar to supervised learning, transduction machine learning does not explicitly construct a function. Rather, transduction machine learning tries to predict new outputs based on training inputs, training outputs, and test inputs which are available while training.

Learning To Learn: Learning to learn machine algorithms learn its own inductive bias based on previous experience.

Training components may prepare one or more prediction models to generate predictions. For example, a prediction model may analyze its predictions against a reference set of data called the validation set. In some use cases, the reference outputs may be provided as inputs to the prediction models, which the prediction model may determine whether its predictions are accurate, to determine the level of accuracy or completeness with respect to the validation set data, or to make other determinations. Such determinations may be utilized by the prediction models to improve the accuracy or completeness of their predictions. In another use case, accuracy or completeness indications with respect to the prediction models' predictions may be provided to the prediction model, which, in turn, may utilize the accuracy or completeness indications to improve the accuracy or completeness of its predictions with respect to input images. For example, a labeled training set may enable model improvement. That is, the training model may use a validation set of data to iterate over model parameters until the point where it arrives at a final set of parameters/weights to use in the model.

One the machine learning model is trained based upon the algorithm and training data set, the machine learning model may be used to identify patterns in complex data. According to one aspect of the invention, the queries that may be conducted as a result of the machine learning methods of the present invention may be beneficially applied to search databases containing large volumes of data to identify associations that corresponds to a particular class of interest, or exhibits a similar pattern. These databases may include data regarding biological data, chemical data, population data, financial data, climate data, image data, auditory data, etc.

The application also envisages re-training of the machine learning model. This may occur, for example, when the data is observed to be different from the predicted parameter values. The difference may be based on the observed data failing to meet predetermined thresholds.

Exemplary Use Cases

Figure 6A:
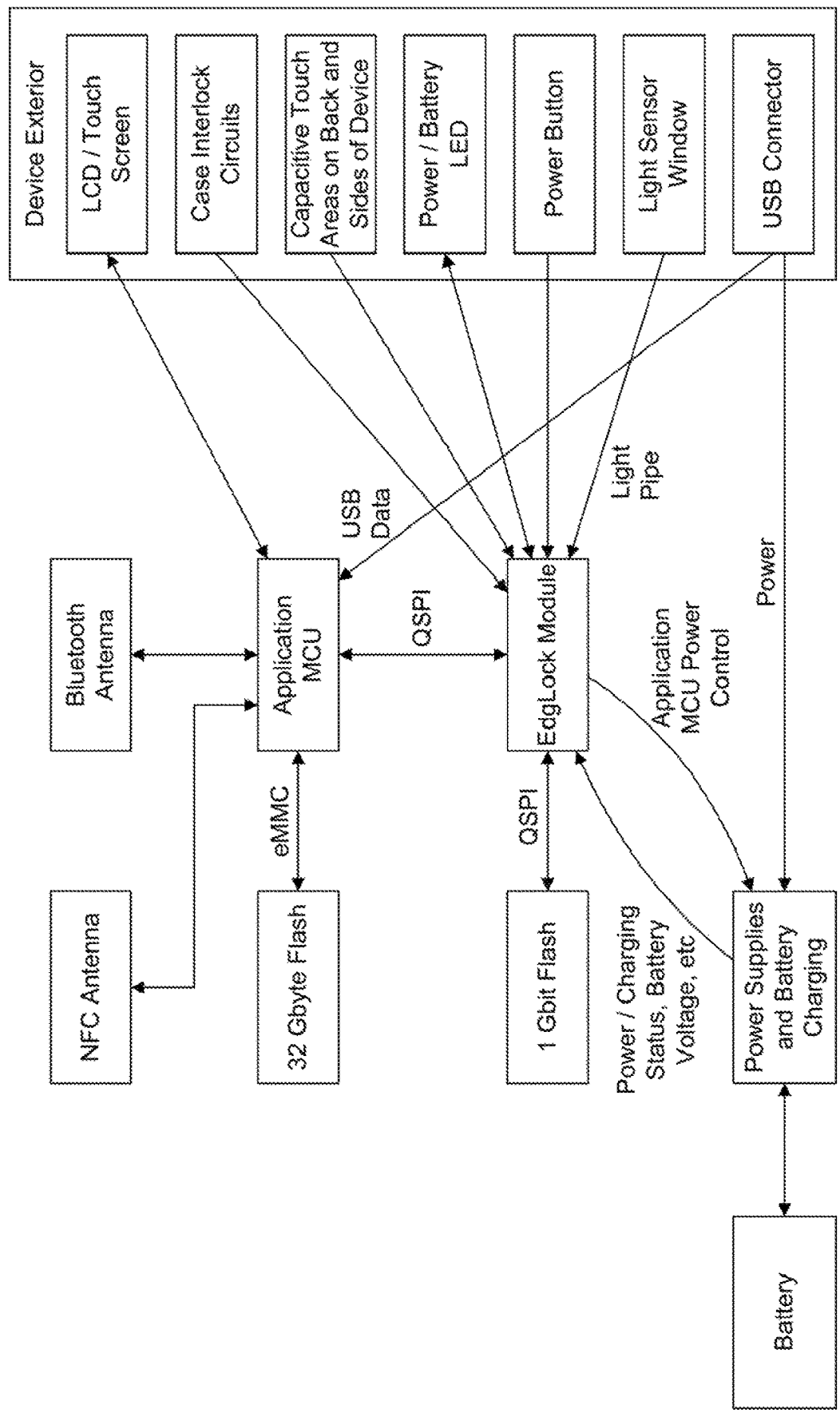
FIGS. 6A-6C illustrate exemplary use cases employing one or more of heuristic and machine learning algorithms described in the application.
Figure 6B:
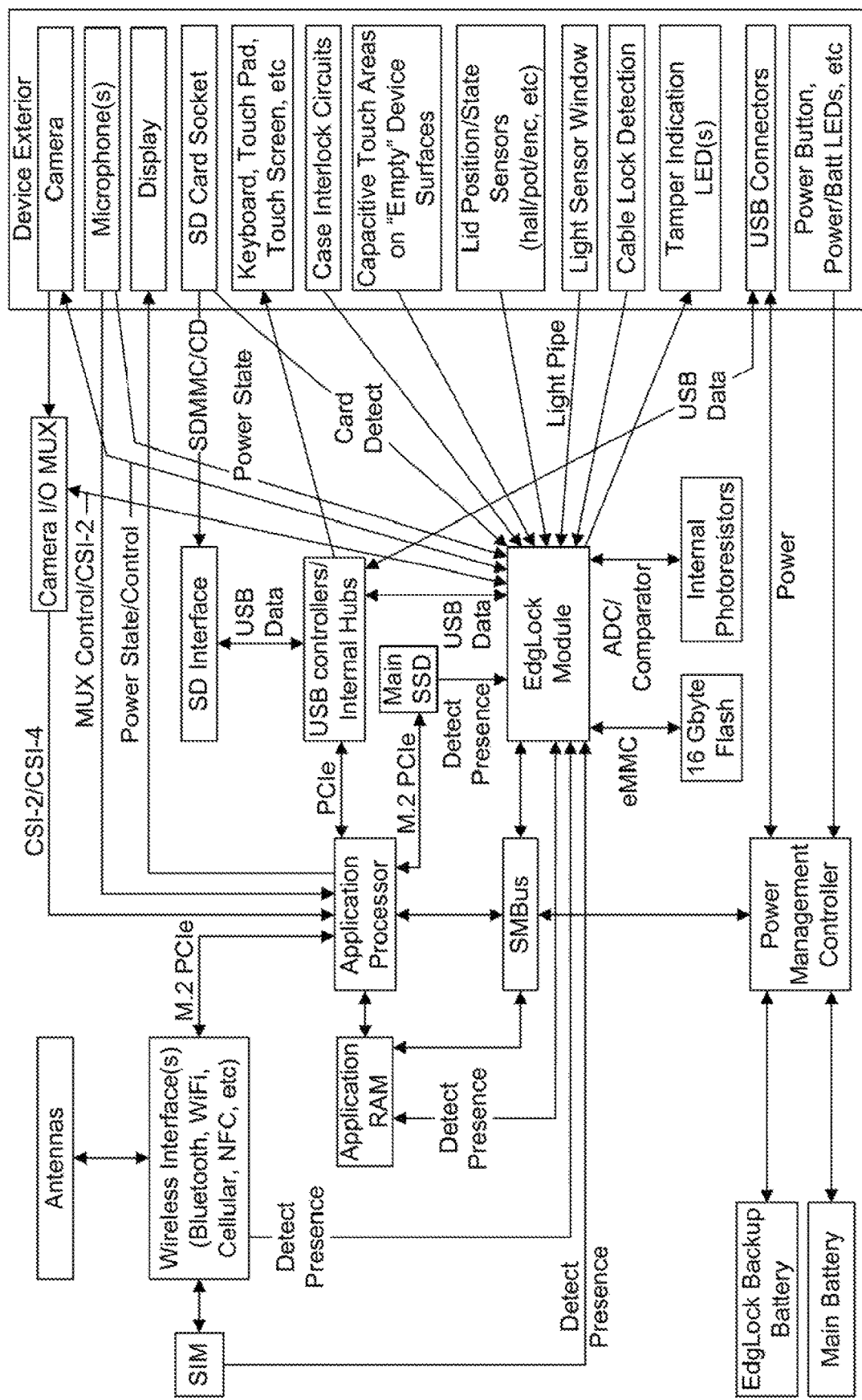
Figure 6C:
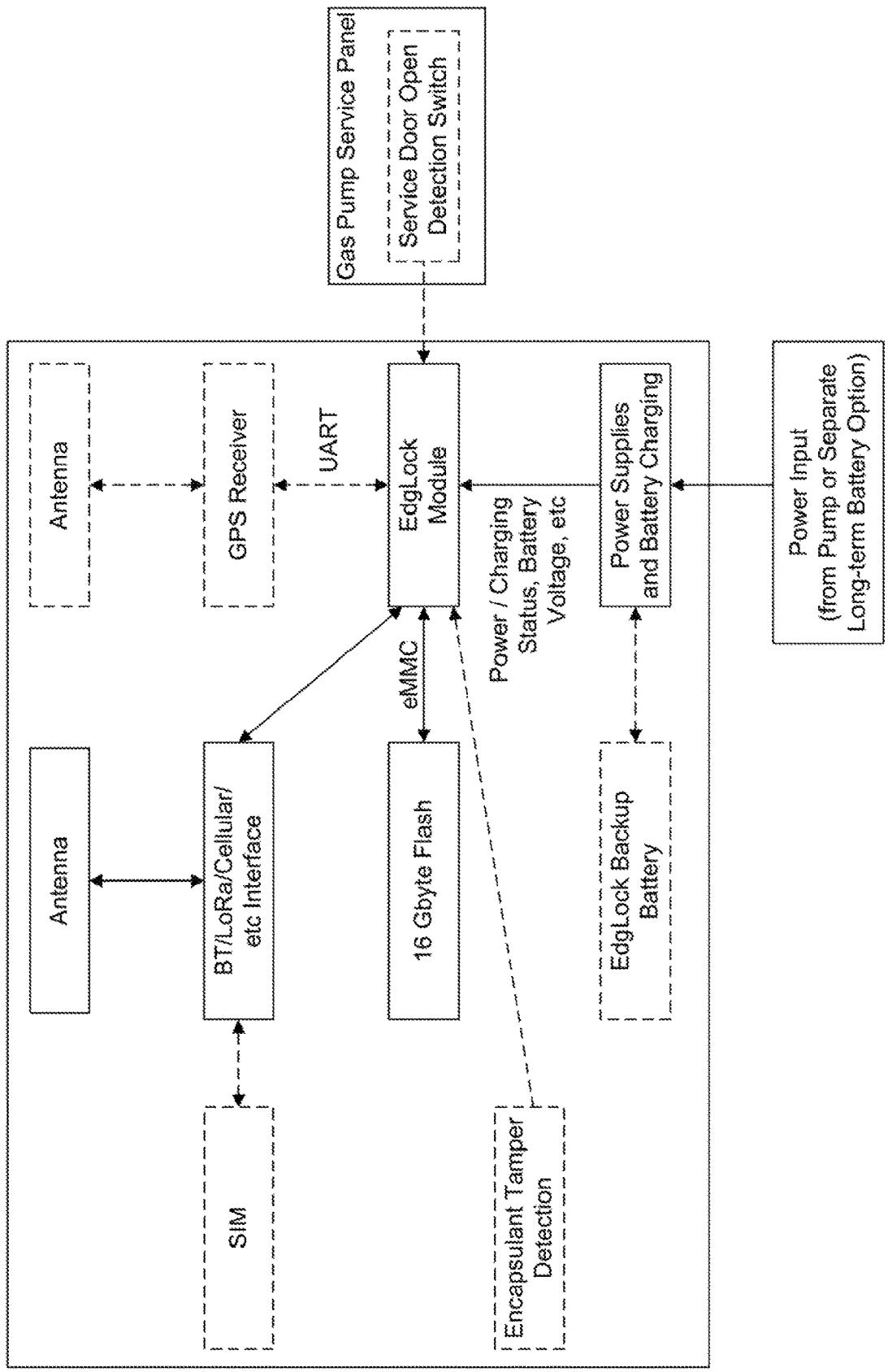

In another aspect of the application, real-life use cases are described in reference to FIGS. 6A-C for a more complete understanding of the invention. As an initial matter, the uses cases described herein are applicable to both the heuristic and machine learning algorithms discussed above. The use cases may include cryptographic hardware devices such as cryptocurrency wallets, consumer electronics, heavy machinery, furniture, leased equipment, recreational equipment, jewelry, important documents, and wireless.

In an embodiment, data produced by the device is cryptographically signed by an internal identity key. This prevents potential attackers from replacing or spoofing the module. Moreover, the device is provisioned with one or more authorized public keys. In addition, received commands are logged and ignored if not signed by an authorized key.

Case interlock circuits are circuits expected to be disturbed when opened or damaged. For example, buttons held down by the case, or wires embedded in the case are monitored by GPIO. Temperature-dependent resistance is monitored by ADC for local temperature variations. It is envisaged that case interlock circuits can be combined with other circuits. In effect, they serve dual purposes as a capacitive touch pad to detect human contact therewith.

In an embodiment of the use cases, FIG. 6A covers a crypto wallet managed by software run on hardware. Particularly, the hardware includes one or more of the following features: (i) battery sufficient to run the module for 1 year in a low-activity environment such as a closed safe; (ii) light pipe from module's on-board light sensor to exterior of case; (iii) signal indicating when connected to USB power source (e.g., to a charger); (iv) signal indicating when connected to USB data interface; (v) signal indicating when main MCU is powered on; (vi) multiple case-interlock connections (wires in case that would disconnect if the case were opened or damaged); (vii) capacitive touch sense pads on back and sides of case; (viii) communication interface to main MCU; (ix) access to an external LED (to indicate low-power by infrequent blinking); (x) access to a bulk storage device (flash IC, μSD card, or the like).

According to FIG. 6A, typical user interaction includes one or more of: (i) user powers on device; (ii) user enters PIN or passcode; (iii) main MCU notifies device of login success or failure. If the action is successful, one or more of the following occur: (i) device is disarmed; (ii) main MCU transfers tamper status and event log from device; (iii) main MCU displays status to user and allows user to browse logs; (iv) user may select sensing profile via user interface provided by main MCU; (v) Device is armed whenever main MCU locks its screen or powers down.

According to an embodiment, host-specific events include: (i) device powered on but user did not authenticate within 1 min; (ii) case interlock tripped; (iii) device connected to USB power; (iv) device connected to USB data; (v) capacitive touch on case pads.

FIG. 6B illustrates another use case covering consumer equipment, such as for example, a laptop. The Hardware includes: (i) Device module embedded in a laptop, connected as an internal USB device, and always powered by a non-removable battery; (ii) light pipe from module's on-board light sensor to exterior of case; (iii) external hall-effect sensor(s) in lower case detecting magnet in lid when closed; (iv) access to signals indicating system power state (probably via SMBus); (v) access to signals indicating whether main system battery is present; (vi) access to signals indicating USB port connection states; (vii) access to signals indicating presence of removable media (SD card, optical disc, etc.) (viii) access to signal indicating presence of SIM card or any other removable internal components; (ix) access to signals indicating whether main system is attempting to enable camera or microphone; (x) access to laptop internal camera, via GPIO-controlled multiplexing of camera interface; (xi) capacitive touch sensors around case, such as to left and right of trackpad; (xii) case interlock circuits to detect when case is opened; (xiii) photoelectric sensor in cable-lock port; (xiv) additional light sensor inside case to detect light inside case; (xv) control of a tri-color LED to indicate arm state/tamper detection; and (xvi) access to a bulk storage device.

According to an embodiment in relation to FIG. 6B describes typical user interaction. Typical user interaction may include one or more of: (i) user logs in to computer; (ii) main OS notifies device of success/failure of authentication. If successful, the device is disarmed, the main OS transfers tamper status and event log from Device, the main OS displays status to user and allows user to browse logs, and/or the user may use a desktop application to configure Device by selecting profiles, adjusting timing, selecting arm conditions, enabling/disabling status LED, etc.

In an embodiment, typical arm conditions include any time the screen locks, any time the case closes, and only when a certain button is pressed.

In an embodiment, host specific events include: (i) host power state change; (ii) main battery connect/disconnect; (iii) external power supply connect/disconnect; (iv) lid open/close; (v) USB port connect/disconnect; (vi) removable media (SD card, optical disc, etc.) attach/detach; (vii) SIM card (or other removable internal component) removed/inserted; (viii) camera enable/disable; (ix) camera enable/disable; (x) mic enable/disable; (xi) capacitive touch sensed on case; (xii) case interlock tripped; (xiii) cable lock attached/detached; (xiv) light detected inside case The device module may also serve as a system's main RTC, drop sensor, lid position sensor, and the like. The device module may also control other system LEDs, such as power indicator, keyboard backlight, and the like.

FIG. 6C illustrates another use case covering heavy machinery, such as for example a gas pump. Features of the hardware includes one or more of the following: (i) Device is primary MCU; (ii) wireless communications interface (Bluetooth, LoRa, cellular, etc.); (iii) designed to run from wide range of power supplies to maximize compatibility; (iv) on-board battery for about 1 week run time if power is lost; (v) connectors to interface to various accessories such as switches to detect service door opening; and (vi) very small board, overall size possibly as small as 1 in$^2$.

Typical user interactions include one or more of the following: (i) a security professional for a service station chain pairs and configures device using a desktop computer or smartphone application; (ii) device is installed inside gas pump; (iii) device reports in real time any suspected tamper, through some network connection back to a monitoring system; (iv) when tamper events are recorded, they are cross-referenced to planned/reported service actions and station security surveillance systems.

Host specific events include one or more of: (i) power attached/detached; (ii) network link connected/disconnected; (iii) unauthorized command received via network link; and (iv) accessory detected activity (e.g., switch indicates service panel was opened).

It is envisaged the device is configured in a controlled access profile by default. The device may also be designed to detect and report direct tamper with the module itself. In the event of extended power loss (>1 week) or direct module tamper detection (perhaps including GPS detection that device has left an assigned geofence, or loss of network communications for a predetermined duration), the module wipes its firmware clean and will require re-provisioning. Data collected before wiping may optionally be retained in a form encrypted for recovery using a public key specified at time of previous device provisioning.

While the system and method have been described in terms of what are presently considered to be specific embodiments, the disclosure need not be limited to the disclosed embodiments. It is intended to cover various modifications and similar arrangements included within the spirit and scope of the claims, the scope of which should be accorded the broadest interpretation so as to encompass all such modifications and similar structures. The present disclosure includes any and all embodiments of the following claims.

What is claimed is:

1. A computer-implemented method for detecting a tamper event comprising:
   receiving, from one or more sensors on an integrated module, data indicating one or more of light, acceleration, magnetic field, rotation, temperature, pressure, humidity, and audio;
   transmitting, to a microcontroller/evaluation engine coupled to the integrated module, the received data from the one or more sensors;
   determining, via the microcontroller, the received data exceeds one or more configurable thresholds of the tamper event;
   assigning, via the microcontroller, a score associated with the received data exceeding the one or more configurable thresholds;
   collecting, via the microcontroller, an aggregate total based on the assigning step; and
   evaluating, via the microcontroller, the aggregate total in view of a predetermined alarm threshold of the tamper event.

2. The method of claim 1, wherein the one or more sensors includes a magnetometer, gyroscope, an accelerometer; and an environmental sensor (T, P, Humidity), microphone, light sensor.

3. The method of claim 1, wherein the data is time stamped.

4. The method of claim 1, wherein the one or more configurable thresholds includes the light, acceleration, magnetic field, or audio exceeding a predetermined threshold.

5. The method of claim 1, wherein the score is a vector.

6. The method of claim 5, the vector includes binary and/or numeric outputs.

7. The method of claim 1, further comprising preprocessing the received data for anomalies.

8. The method of claim 1, further comprising storing the received data on a non-transitory memory coupled to the integrated module.

9. The method of claim 1, further comprising determining the aggregate total exceeds the predetermined alarm setting of the tamper event.

10. The method of claim 8, wherein the tamper event is exhibited in one or more of a closed container environment, controlled access environment, quasi-controlled environment, and open access environment.

11. The method of claim 1, further comprising transmitting information of the evaluating step to a user interface of an application on a smart device or to another microcontroller on a host device.

12. The method of claim 11, wherein the information includes one or more of an alert and logged event.

13. The method of claim 12, wherein the alert is exhibited by a response of the one or more sensors on the integrated module.

14. The method of claim 1, wherein the one or more sensors operate at a lower data rate during the receiving step than after the tamper event.

15. A system comprising
   a non-transitory memory; and
   a processor coupled to the memory and configured to execute instructions of:
      receiving, from one or more sensors on an integrated, module, data indicating one or more of light, acceleration, magnetic field, rotation, temperature, pressure, humidity, and audio;
      transmitting, to a microcontroller/evaluation engine coupled to the integrated module, the received data from the one or more sensors;
      determining, via the microcontroller, the received data exceeds one or more configurable thresholds of a tamper event;
      assigning, via the microcontroller, a score associated with the received data exceeding the one or more configurable thresholds; and
      collecting, via the microcontroller, an aggregate total based on the assigning step.

16. The system of claim 15, wherein the processor is further configured to execute the instructions of evaluating, via the microcontroller, the aggregate total in view of a predetermined alarm threshold of the tamper event.

17. The system of claim 15, further comprising a display including a graphical user interface operably coupled to the processor.

18. The system of claim 17, wherein the processor is configured to transmit information of the evaluating step to the graphical user interface.

19. The system of claim 18, wherein the information includes one or more of an alert and logged event, and wherein the alert is exhibited by a response of the one or more sensors on the integrated module.

20. The system of claim 15, wherein the sensors operate at a lower data rate during the receiving step than after the tamper event, and wherein the one or more sensors is sampled at various frequencies.

* * * * *